(12) United States Patent
Stirtzinger et al.

(10) Patent No.: US 9,686,305 B2
(45) Date of Patent: Jun. 20, 2017

(54) CYBER-SEMANTIC ACCOUNT MANAGEMENT SYSTEM

(71) Applicant: Securboration, Inc., Melbourne, FL (US)

(72) Inventors: Anthony Stirtzinger, Ponte Vedra Beach, FL (US); Keith Shapiro, Saint Louis, MO (US); Brian Warhover, Fairview Heights, IL (US); Bruce McQueary, Indialantic, FL (US)

(73) Assignee: Securboration, Inc., Melbourne, FL (US)

( * ) Notice: Subject to any disclaimer, the term of this patent is extended or adjusted under 35 U.S.C. 154(b) by 27 days.

(21) Appl. No.: 14/085,493

(22) Filed: Nov. 20, 2013

(65) Prior Publication Data

US 2014/0143873 A1    May 22, 2014

Related U.S. Application Data

(60) Provisional application No. 61/728,384, filed on Nov. 20, 2012.

(51) Int. Cl.
*G06F 11/00* (2006.01)
*H04L 29/06* (2006.01)
*H04W 12/12* (2009.01)

(52) U.S. Cl.
CPC ...... *H04L 63/1441* (2013.01); *H04L 63/1408* (2013.01); *H04W 12/12* (2013.01)

(58) Field of Classification Search
CPC ............ H04L 63/1441; H04L 63/1408; H04L 63/1425; H04W 12/12

USPC .......................................................... 726/23
See application file for complete search history.

(56) References Cited

U.S. PATENT DOCUMENTS

| | | | | |
|---|---|---|---|---|
| 8,180,873 | B2* | 5/2012 | Bhatt | H04L 63/1416 709/223 |
| 8,280,833 | B2* | 10/2012 | Miltonberger | 706/45 |
| 8,396,890 | B2* | 3/2013 | Lim | 707/781 |
| 8,578,480 | B2* | 11/2013 | Judge | H04L 12/585 713/189 |
| 8,862,526 | B2* | 10/2014 | Miltonberger | 706/15 |
| 9,516,053 | B1* | 12/2016 | Muddu | H04L 63/1425 |
| 2004/0255163 | A1* | 12/2004 | Swimmer et al. | 713/201 |
| 2007/0289013 | A1* | 12/2007 | Lim | 726/22 |
| 2012/0151585 | A1* | 6/2012 | Lamastra et al. | 726/24 |

* cited by examiner

*Primary Examiner* — Samson Lemma

(57) ABSTRACT

Systems, methods, and apparatus for identifying anomalous behavior are provided. For example, a method may include receiving raw data, generating a behavior profile for the entity based on the raw data, receiving comparison data, determining whether the comparison data deviates from a pattern of behavior defined in the behavior profile, and identifying the comparison data as anomalous behavior when the comparison data deviates from the pattern of behavior. In one embodiment, the raw data includes recorded activity for the entity. In one embodiment, the behavior profile defines a pattern of behavior for the entity. In one embodiment, a countermeasure is performed upon identifying anomalous behavior. The countermeasure may include at least one of revoking the entity's credentials, denying the entity access to a resource, shutting down access to a port, and denying access to the entity. The method may further include providing a report of the anomalous behavior.

20 Claims, 22 Drawing Sheets

MODEL SUSPECT PROFILE

WEB APP 1 ▼  
VIEW: VIEW 1 ▼

DATE RANGE [SET]  
BENCHMARK 07/01/2013 - 08/02/2013 (33 DAYS)  
COMPARE 08/03/2013 - 08/04/2013 (2 DAYS)

| ATTRIBUTE | TYPE | PROFILE | COUNT | UNIQUE | MIN | MAX | AVG | SD | FIRST - LAST |
|---|---|---|---|---|---|---|---|---|---|
| LOGIN | STRING | BENCHMARK | 5040 | 7 | | | | | 07/01/13 00:00:00 - 08/02/13 23:50:00 |
| | | COMPARE | 560 | 7 | | | | | 08/03/13 00:00:00 - 08/04/13 17:10:00 |
| | | NEW | 0 | 0 | | | | | --- |
| CLIENT IP | STRING | BENCHMARK | 5040 | 5 | | | | | 07/01/13 00:00:00 - 08/02/13 23:50:00 |
| | | COMPARE | 510 | 5 | | | | | 08/03/13 00:00:00 - 08/04/13 17:10:00 |
| | | NEW | 50 | 1 | | | | | 08/04/13 00:00:00 - 08/04/13 04:05:00 |
| PAGE | STRING | BENCHMARK | 5040 | 9 | | | | | 07/01/13 00:00:00 - 08/02/13 23:50:00 |
| | | COMPARE | 542 | 9 | | | | | 08/03/13 00:00:00 - 08/04/13 17:10:00 |
| | | NEW | 18 | 1 | | | | | 08/04/13 00:00:00 - 08/04/13 03:55:00 |
| BYTES | INT | BENCHMARK | 5040 | 7 | 12788 | 43555 | 21966 | 13504.62 | 07/01/13 00:00:00 - 08/02/13 23:50:00 |
| | | COMPARE | 460 | 7 | 12788 | 43555 | 22039 | 12914.26 | 08/03/13 00:00:00 - 08/04/13 17:10:00 |
| | | NEW | 100 | 4 | 66666 | 66666 | 39577 | 29497.99 | 08/04/13 00:00:00 - 08/04/13 04:05:00 |

ATTRIBUTE PROFILE

1 - 6 OF 6

| CLIENT IP ▼ | COUNT | MIN DATE | MAX DATE | LOGIN | PAGE | BYTES |
|---|---|---|---|---|---|---|
| 10.2.345.67 | 82 | 8/3/2013 12:10:00 AM | 8/4/2013 4:50:00 PM | 6 | 8 | 6 |
| 123.11.222.33 | 88 | 8/3/2013 12:20:00 AM | 8/4/2013 3:40:00 PM | 6 | 8 | 6 |
| 144.98.10.10 | 64 | 8/3/2013 12:50:00 AM | 8/4/2013 4:20:00 PM | 6 | 6 | 4 |
| 192.128.24.1 | 64 | 8/3/2013 12:00:00 AM | 8/4/2013 5:10:00 PM | 6 | 6 | 4 |
| 192.168.23.67 | 212 | 8/3/2013 12:00:00 AM | 8/4/2013 11:10:00 AM | 1 | 4 | 3 |
| 200.300.111.9 | 50 | 8/4/2013 12:00:00 AM | 8/4/2013 4:05:00 AM | 1 | 3 | 2 |

FIG.20

CYBER-SEMANTIC ACCOUNT MANAGEMENT SYSTEM

CROSS-REFERENCE TO RELATED APPLICATIONS

This application claims priority to U.S. Provisional Patent Application No. 61/728,384 entitled "Cyber-Semantic Account Management System (C-SAMS)," filed Nov. 20, 2012. The above-referenced Provisional Patent Application is hereby incorporated by reference in its entirety.

GOVERNMENT STATEMENT

This technology was made with government support under Contract Number FA8750-08-C-0062 awarded by the Air Force Research Laboratory. The government may have certain rights in the technology.

BACKGROUND

A Cyber-attack is a type of offensive maneuver that targets computer systems, infrastructures, computer networks, and/or personal computers devices by various malicious acts that either steals, alters, or destroys a specified target by hacking into a susceptible system. In one example, a hacker/unauthorized user may login to a computer system using valid login credentials. Traditional defensive measures for identifying malicious activity associated with compromised login credentials or insider attacks often are not effective because the unauthorized user is granted access to the computer system via normal channels using valid credentials.

It is with respect to these and other general considerations that embodiments have been made. Although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

In one aspect the technology relates to identifying anomalous behavior of an entity. In one embodiment, a method may include receiving raw data, generating a behavior profile for the entity based on the raw data, receiving comparison data, determining whether the comparison data deviates from a pattern of behavior defined in the behavior profile, and identifying the comparison data as anomalous behavior when the comparison data deviates from the pattern of behavior. In one embodiment, the raw data includes recorded activity for the entity. In one embodiment, the behavior profile defines a pattern of behavior for the entity. In one embodiment, the behavior profile is constructed for a specific date range. In one embodiment, the raw data includes at least one of web service endpoints, mission role data, system transactions, and resource access. In one embodiment, the raw data is weblog data. The weblog data may include at least one of IP address information, browsing history, download data, and time information. In one embodiment, a countermeasure is performed upon identifying anomalous behavior. The countermeasure may include at least one of revoking the entity's credentials, denying the entity access to a resource, shutting down access to a port, and denying access to the entity. The method may further include providing a report of the anomalous behavior.

In one embodiment, a method for generating the behavior profile includes transforming the raw data into one or more relational database objects and constructing the behavior profile using relational algebra. The method for generating the behavior profile may further include normalizing data in the behavior profile.

In one embodiment, a method for determining whether the comparison data deviates from the pattern of behavior includes comparing the comparison data to the behavior profile and identifying a first portion of the comparison data that does not exist in the behavior profile as anomalous behavior. In one embodiment, the method for determining whether the comparison data deviates from the pattern of behavior is based upon statistical analysis. Portions of the comparison data that lie outside a standard deviation of the behavior profile are identified as anomalous behavior.

In one embodiment, a computer storage medium encoding computer executable instructions that, when executed by at least one processor, perform a method of identifying anomalous behavior of an entity, the method may include receiving raw data, generating a behavior profile for the entity based on the raw data, receiving comparison data, comparing the comparison data to the behavior profile, and identifying a first portion of the comparison data that does not exist in the behavior profile as anomalous behavior. In one embodiment, the raw data includes recorded activity for the entity. In one embodiment, the behavior profile defines a pattern of behavior for the entity. In one embodiment, the raw data is weblog data. The weblog data may include at least one of IP address information, browsing history, download data, and time information. In one embodiment, a countermeasure is performed upon identifying anomalous behavior. The countermeasure may include at least one of revoking the entity's credentials, denying the entity access to a resource, shutting down access to a port, and denying access to the entity. The method may further include providing a report of the anomalous behavior.

In one embodiment, a computer storage medium encoding computer executable instructions that, when executed by at least one processor, perform a method of comparing the comparison data to the behavior data, the method may include performing a statistical analysis on the behavior profile. Portions of the comparison data that lie outside a standard deviation of the behavior profile are identified as anomalous behavior.

In one embodiment, a computer storage medium encoding computer executable instructions that, when executed by at least one processor, perform a method of generating the behavior profile, the method may include transforming the raw data into one or more relational database objects and constructing the behavior profile using relational algebra.

In one embodiment, a system may include a server, where the server includes at least one processor and a memory. The memory may be for encoding computer executable instructions that, when executed by the processor, performs a method of identifying anomalous behavior of an entity. The method performed may include receiving raw data, generating a behavior profile for the entity based on the raw data, receiving comparison data, comparing the comparison data to the behavior profile, identifying a first portion of the comparison data that does not exist in the behavior profile as anomalous behavior, and generating a report of the anomalous behavior. In one embodiment, the raw data includes recorded activity for the entity. In one embodiment, the behavior profile defines a pattern of behavior for the entity. In one embodiment, the behavior profile is generated using relational algebra. The method may further include generating a cache table to store the behavior profile. The system may further include a client in communication with the server. In one embodiment, the client receives and displays the report.

These and other features and advantages, which character the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

BRIEF DESCRIPTION OF THE DRAWINGS

Non-limiting and non-exhaustive embodiments are described with reference to the following Figures in which:

FIG. 7 is a graphical user interface example illustrating suspect user profiles according to an embodiment of the present disclosure.

FIG. 8 is a graphical user interface example illustrating filtering of suspect user profiles by categories according to an embodiment of the present disclosure.

FIG. 20 is a graphical user interface example illustrating a suspect grid according to an embodiment of the present disclosure.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, a software implementation or an implementation combining software and hardware aspects. The following detailed description is, therefore, not to be taken in a limiting sense.

The present disclosure generally relates to identifying anomalous behavior in one or more systems. Accordingly, embodiments described herein include systems and methods for identifying anomalous behavior in one or more systems. In one example, a system may include a cyber-semantic account management system (C-SAMS). A C-SAMS system may be configured to detect cyber threats (e.g., anomalous behavior) when valid login credentials have been compromised by an unauthorized user. For example, the C-SAMS system may be operable to automatically generate user behavior profiles based on user activity observed in one or more network environments. The user behavior profiles may serve as a model of expected behavior such that any activity that deviates from the model of expected behavior may be identified as anomalous behavior.

Figure 1:
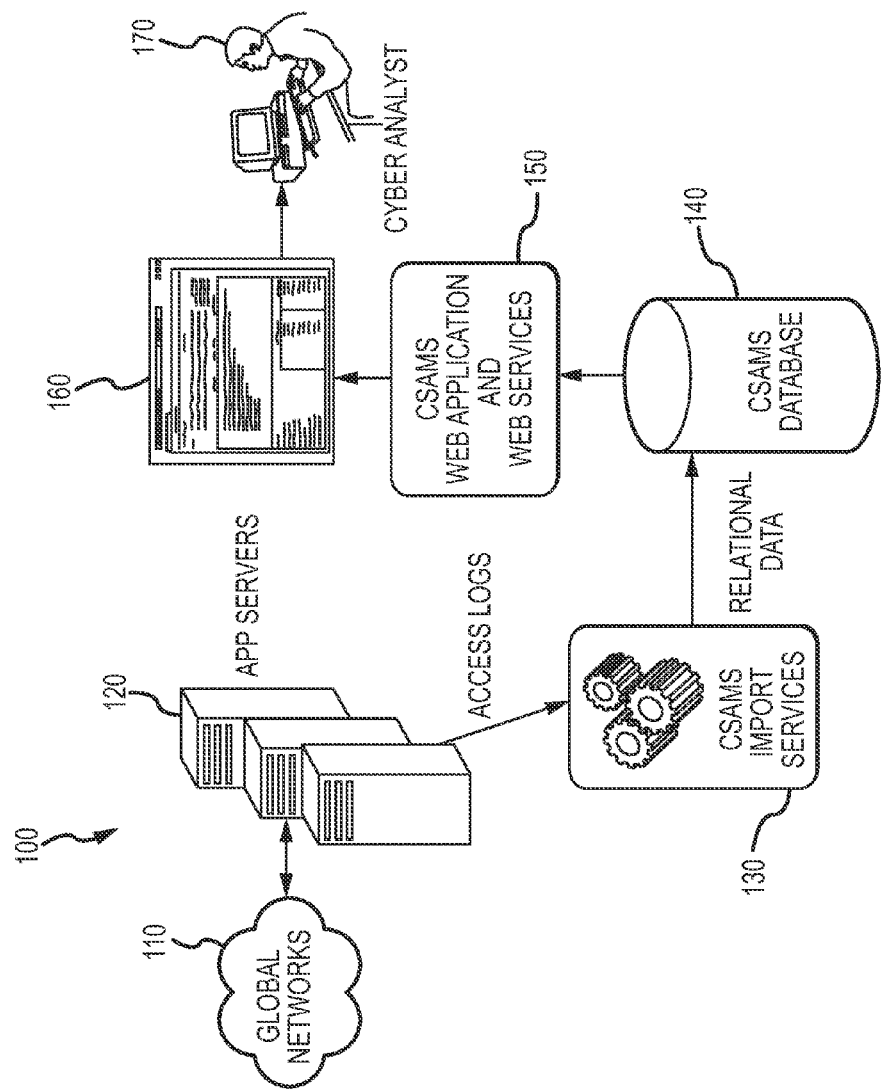
FIG. 1 is a block diagram illustrating an operating environment for identifying anomalous behavior according to an embodiment of the present disclosure.

FIG. 1 illustrates an operating environment 100 for to identifying anomalous behavior according to one or more embodiments disclosed herein. As shown in FIG. 1, the operating environment 100 may include one or more networks 110, application servers 120, import services 130, a database 140, web services 150, and a graphical user interface (GUI) 160. Although FIG. 1 may be described in relation to a C-SAMS system, the embodiments described relative to FIG. 1 may be used in any system capable of identifying anomalous behavior.

The one or more networks 110 may be any communication network. Such communication networks may include, but are not limited to, satellite networks, mobile wireless networks, computer networks, the Internet, etc. The application servers 120 may include at least one computer program for processing and/or storing raw data. In one example, raw data is any data that can be tracked over a period of time over one or more networks 110 (e.g., behavioral data and/or activity data). Behavioral data may include data that is observable and that represents a repeatable pattern of and entity's activity. Activity data may include data that is observable and that represents entity actions performed over one or more networks, for example. An entity may include a user, an individual, an application, software, a person, a process, a group, etc. In one example, the raw data may include weather data, recorded activities of an entity, data representing lights turning on and off, entry into any system requiring authorization, web service endpoints, mission role data, system transactions, resource access, etc. As such, any raw data communicated via the one or more networks 110 may be processed and/or stored by the application servers 120. In one embodiment, the raw data may be in the form of weblog data, access logs, database tables, XML files, HTML files, etc. In one example, the weblog data may include at least one of IP address information, browsing history, download data, and time information.

The import services 130 may include at least one computer program for receiving the raw data from the application servers 120, generating a behavior profile based on the raw data, receiving comparison data, and determining whether the comparison data deviates from a pattern of behavior defined in the behavior profile. In one embodiment, the behavior profile is generated for an entity and is based on recorded activity for the entity. In this regard, the behavior profile defines a pattern of behavior for the entity. In one example, the behavior profile may be generated from a single entity such that the behavior of other entities is not used when generating the behavior profile. As such, the behavior profile is unique to the entity such that unauthorized access using the entity's credentials may be more easily identified. Furthermore, the behavior profile may be generated using less raw data and may be absent from complex profile dependencies. In another example, the behavior profile may be generated from a group of users. The group of users may share common characteristics such as their role/position, location, duties, etc. The recorded activity for the entity may include attributes such as a timestamp, client information (e.g., Internet Protocol and Domain address information), page request Uniform Resource Locator (URL) (e.g., query string, method and protocol), returned status, returned bytes, public key infrastructure (PKI) status, page referrer URL, common access card information (e.g., First, Last, Middle, Suffix, and Number), login name, encryption information (e.g., protocol, cipher, and bit count), user agent string, etc.

Behavior profiles may be indexed based on the attributes of the recorded activity. For example, the behavior profile may be indexed based on the timestamp. Indexing the behavior profile based on the timestamp may facilitate the construction of patterns of behavior based on hourly activity, daily activity, weekly activity, monthly activity, etc. In another example, the behavior profile may be indexed based on page request URL. Indexing the behavior profile based on the page request URL may facilitate the construction of patterns of behavior based on unique page visits of the entity. In another example, the behavior profile may be indexed based on breaking down encryption information into sub components. Indexing the behavior profile based on encryption attributes (e.g., cipher, protocol and bits) may facilitate the construction of behavior patterns based on browser and client settings. These examples are merely illustrative and the behavior profile may be indexed based on any attributes of the recorded activity.

The behavior profile may be generated using any desirable amount of raw data. For example, the behavior profile may be generated based on a day of raw data, an hour of raw data, a week of raw data, a month of raw data, a year of raw data, etc. In one example, the amount of raw data used to generate the behavior profile may be based on the type of anomalous behavior that is being identified. For example, if suspect criteria may be linked to number based thresholds then raw data can be processed without the need for a minimum sample size. In another example, the amount of raw data used to generate the behavior profile may be based on the content of the data. For example, the content of the data may include the type of activity that has actually been recorded in the raw data. In this regard, the behavior profile may be generated for any date range defined and/or identified by the raw data. The date range used to generate the behavior profile may be a benchmark date range. The benchmark date range may be configurable. The benchmark date range may be based on historical data of a user that has been identified as expected behavior. As such, data based on recent activity of a user (e.g., comparison data) may be compared with the behavior profile having a benchmark date range to identify anomalous behavior.

Generating the behavior profile may include transforming the raw data into one or more relational database objects and constructing the behavior profile using relational algebra. For example, the raw data may be organized into a variety of tables based on the attributes of the entity recorded activity. The behavior profile may be constructed based on the variety of attribute tables using relational algebra such that the behavior profile is a separate table based on one entity and the entity's corresponding attributes (e.g., recorded activity). In this regard, the relational database objects and the behavior profile may be stored in the database 140. In one embodiment, the behavior profile may be stored in a cache of the database 140. In embodiments, a cache is a type of storage that allows for faster retrieval of data when a request is made. As such, when an analyst 170 wants to view and analyze behavior profiles via GUI 160, the behavior profiles are retrieved quickly via the web services 150. The web service 150 is an interface between the GUI 160 and the database 140 such that the behavior profiles may be viewed in a graphical format.

In one embodiment, when an analyst 170 requests to view an entity's behavior profile via GUI 160, the behavior profile for the specified entity may be generated at the time of the request and placed in the cache of the database 140. The behavior profile generated on demand may also be deleted on demand. In turn, size of the database 140 and/or cache is not a constraint on the system.

Figure 2:
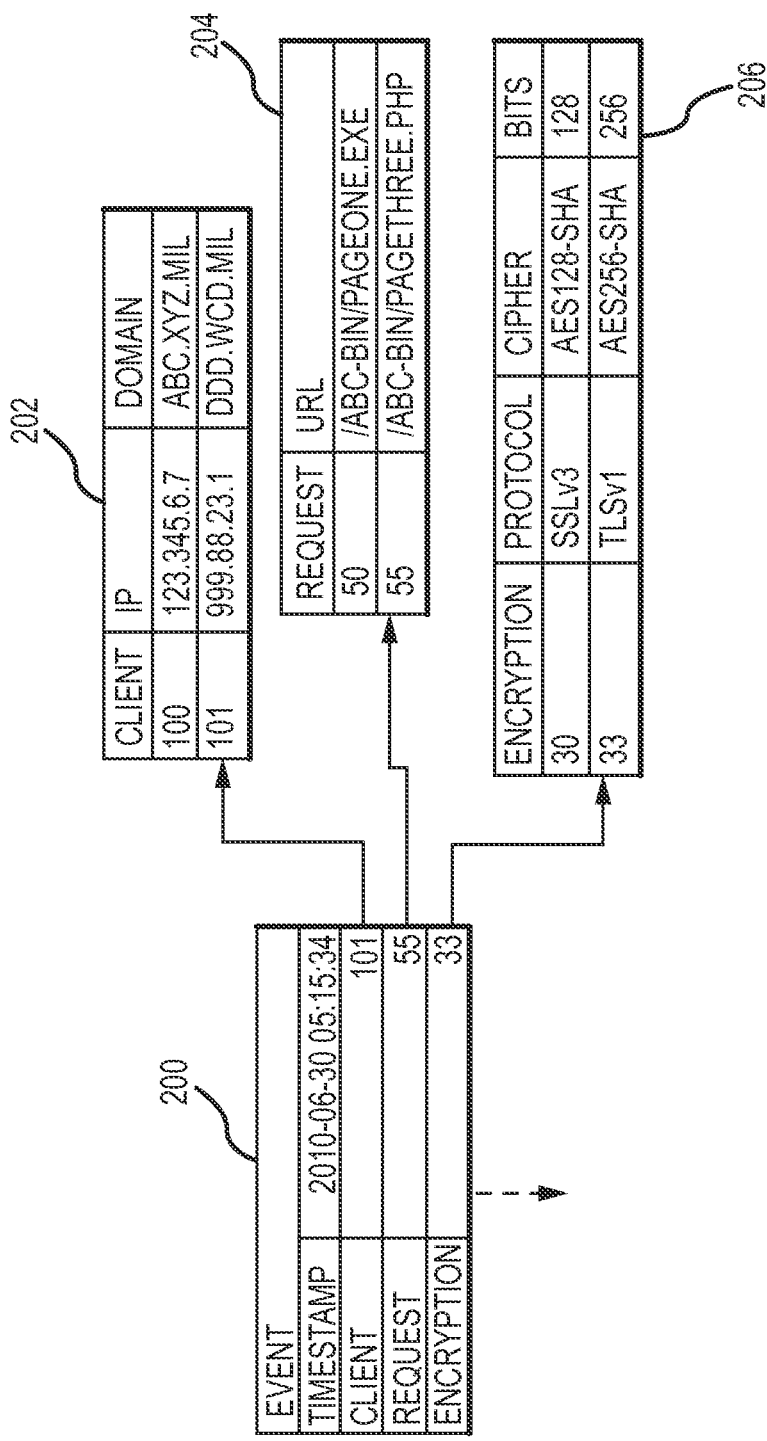
FIG. 2 is an example of normalizing data in a behavior profile according to an embodiment of the present disclosure.

In one embodiment, and with reference now to FIG. 2, generating the behavior profile may include normalizing the data in the behavior profile. FIG. 2 illustrates an example of normalizing data in a behavior profile. Table 200 may be normalized such that the data is organized into three separate tables 202, 204, and 206. For example, table 202 may index the data by client number, table 204 may index the data by request number, and table 206 may index the data by encryption type. Due to the potential for large amounts of input data and the effect this would have on importing into persistent storage, normalization techniques are used to reduce storage requirements by avoiding the storage of duplicate items.

As discussed above, and with reference back to FIG. 1, the import services 130 may receive comparison data. The comparison data may be raw data (e.g., unprocessed data transmitted over one or more networks 110) that is received or data that is part of the behavior profile. For example, comparison data may include data from the behavior profile of the entity being identified for anomalous behavior. In another example, comparison data may include recorded activity data of the entity or suspect being watched for anomalous behavior. The date range used to create the comparison data may be configurable and may include a time slice that is before, after, or within the benchmark date range.

As discussed above, the import services 130 may determine whether the comparison data deviates from a pattern of behavior defined in the behavior profile. In one example, determining whether the comparison data deviates from a pattern of behavior defined in the behavior profile may include comparing the comparison data to the behavior profile and identifying as anomalous behavior a first portion of the comparison data that does not exist in the behavior profile. In one example, comparing the comparison data to the behavior profile may include overlaying the comparison data with the behavior profile to identify any differences. In another example, comparing the comparison data to the behavior profile may include identifying activities in the comparison data that are or are not in the behavior profile. In a further example, comparing the comparison data to the behavior profile may include analyzing attributes of the recorded activity such as access times, location data, information, page requests made, returned status, returned bytes, PKI status, page referrer URL, common access card information, login name, encryption information, weather data, etc. As such, any portion of the comparison data that does not exist in the behavior profile may be identified as anomalous behavior. Additionally, the lack of expected behavior in the comparison data (e.g., expected behavior that does exist in the behavior profile) may be identified as anomalous behavior.

In another example, determining whether the comparison data deviates from a pattern of behavior defined in the behavior profile may be based upon statistical analysis. In this example, statistical analysis may be performed to obtain minimum, maximum, average, and standard deviation values for daily activity. Statistical analysis may also be used to calculate bandwidth thresholds on arbitrary number based behavior attributes. Portions of the comparison data that lie outside a standard deviation of the behavior profile or exceed established thresholds are determined to deviate from the pattern of behavior defined in the behavior profile. As such, the portions of comparison data determined to deviate from the pattern of behavior defined in the behavior profile may be identified as anomalous behavior. Portions of comparison data determined to deviate from the pattern of behavior defined in the behavior profile may include an absence of behavior.

When the comparison data deviates from the pattern of behavior, the comparison data may be identified as anomalous behavior. When the comparison data is identified as anomalous behavior, a countermeasure may be performed. The countermeasure may include revoking the entity's credentials, denying the entity access to a resource, shutting down access to a port, denying access to a resource, and/or performing any other type of countermeasure known to the art. In turn, a threat to a resource, for example, may be prevented and/or stopped.

The import services 130 may further include at least one computer program for providing a report of the anomalous behavior. The report may be a suspect activity report and/or an interactive report. The suspect activity report may define criteria for suspect activity. For example, the suspect activity report may include a day of the week and report the criteria for suspect activity for that day of the week. The analyst 170 may view the report and identify an entity who meets the most criteria for suspect activity. The interactive report may define criteria for normal activity (e.g., the pattern of behavior defined in the behavior profile) and for suspect activity. The analyst 170 may compare the normal activity with the suspect activity to discover additional relationships and patterns. Interactive reports may also allow the analyst 170 to view the source data used generate the reports.

Figure 3:
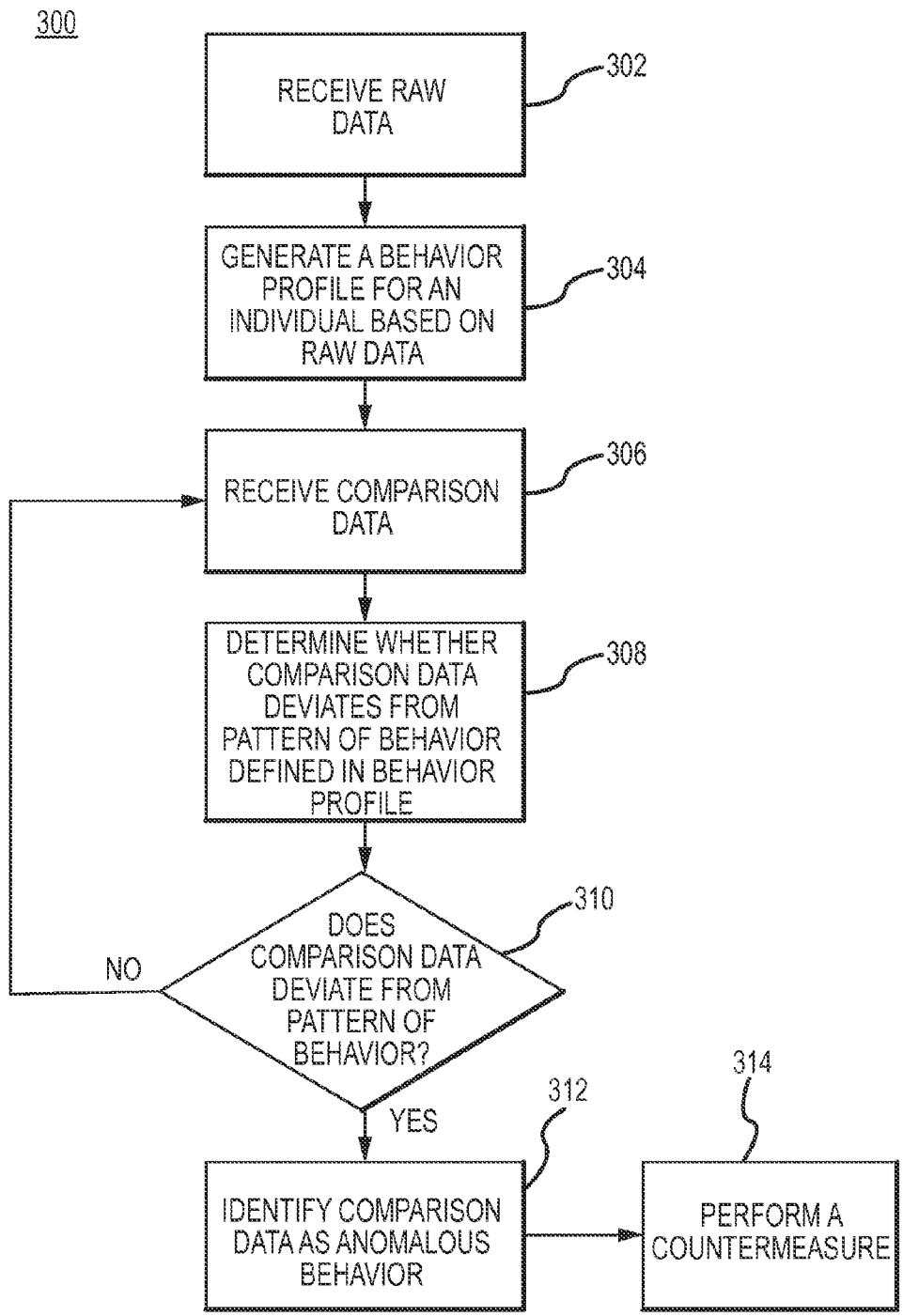
FIG. 3 is a flow diagram illustrating operations for identifying anomalous behavior of an entity according to a first embodiment of the present disclosure.

FIG. 3 illustrates a method 300 for identifying anomalous behavior of an entity according to one or more embodiments of the present disclosure. Method 300 begins at operation 302 in which raw data is received. For example, raw data may be received by the application server and/or the import services. In one example, the raw data is any data that can be tracked over a period of time (e.g., behavioral data and/or activity data). For example, the raw data may include weather data, recorded activities of an entity, data representing lights turning on and off, entry into any system requiring authorization, web service endpoints, mission role data, system transactions, resource access, etc. As such, any raw data communicated via a network may be processed and/or stored by the application servers. In one embodiment, the raw data may be in the form of weblog data. In one example, the weblog data may include at least one of IP address information, browsing history, download data, and time information.

Method 300 continues to operation 304 in which a behavior profile for an entity is generated based on the raw data. For example, the import services may generate a behavior profile for an entity based on the raw data. The behavior profile may define a pattern of behavior for the entity. In one embodiment, the behavior profile may be generated using any desirable amount of raw data. For example, the behavior profile may be generated based on a day of raw data, an hour of raw data, a week of raw data, a month of raw data, a year of raw data, etc. In another example, the amount of raw data used to generate the behavior profile may be based on the content of the data. For example, the content of the data may include the type of activity that has actually been recorded in the raw data. In this regard, the behavior profile may be generated for any date range supported by the raw data.

At operation 306, comparison data is received. The comparison data may be raw data that is received or data that is part of the behavior profile. For example, comparison data may include data from the behavior profile of the entity being identified for anomalous behavior. In another example, comparison data may include recorded activity data from raw data of the entity being identified for anomalous behavior. The date range used to create the comparison data may be configurable and may include a time slice that is before, after, or within the benchmark date range.

After comparison data is received, flow proceeds to operation 308 where it is determined whether the comparison data deviates from the pattern of expected behavior defined in the behavior profile. For example, the comparison data may be compared to the behavior profile and a first portion of the comparison data that does not exist in the behavior profile may be determined to deviate from the pattern of expected behavior as defined in the behavior profile. Comparison data that deviates from the pattern of expected behavior defined in the behavior profile may then be identified as anomalous behavior. In another example, statistical analysis may be used. In one example, statistical analysis may be performed to obtain minimum, maximum, average, and standard deviation values for daily activity. Portions of the comparison data that lie outside a standard deviation of the behavior profile are determined to deviate from the pattern of behavior defined in the behavior profile. In another example, statistical analysis may be used to calculate a bandwidth threshold of daily activity. Statistical analysis may be used to calculate a bandwidth threshold of daily activity. Portions of the comparison data that exceed the bandwidth threshold of the behavior profile are determined to deviate from the pattern of behavior defined in the behavior profile. As such, the portions of comparison data determined to deviate from the pattern of behavior defined in the behavior profile may be identified as anomalous behavior. Portions of comparison data determined to deviate from the pattern of behavior defined in the behavior profile may include an absence of behavior.

At operation 310, if the comparison data deviates from the pattern of behavior defined in the behavior profile, flow proceeds to operation 312 where the comparison data is identified as anomalous behavior. When the comparison data is identified as anomalous behavior, flow proceeds to operation 314 where a countermeasure is performed. If the comparison data does not deviate from the pattern of behavior defined in the behavior profile, the comparison data is identified as expected behavior and flow proceeds back to operation 306 where comparison data is received.

Figure 4:
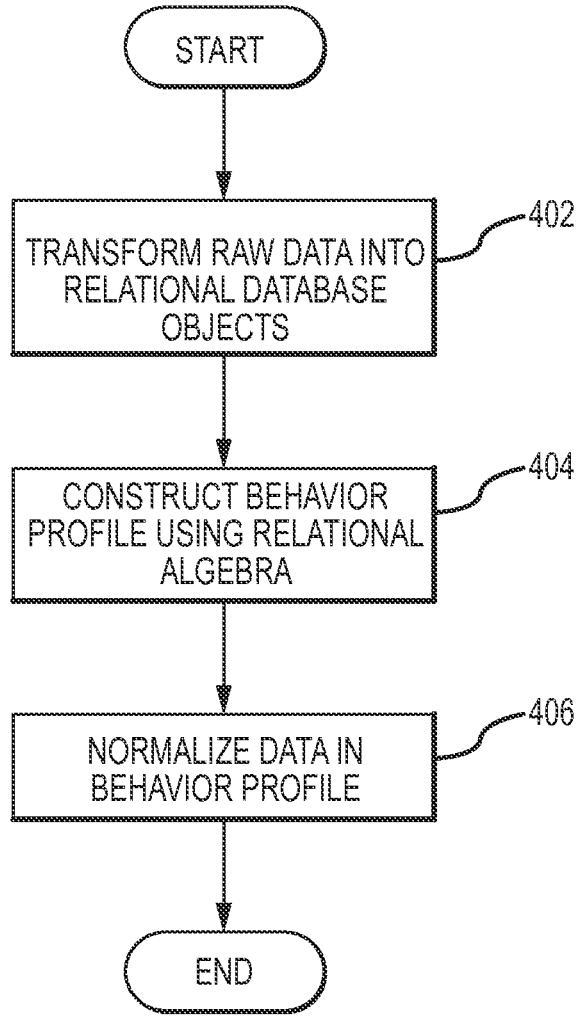
FIG. 4 is a flow diagram illustrating operations for generating a behavior profile for an entity based on raw data according to an embodiment of the present disclosure.

FIG. 4 illustrates a method 400 for generating a behavior profile for an entity based on raw data according to one or more embodiments of the present disclosure. In one embodiment, a method 400 begins at operation 402 in which the raw data is transformed into relational database objects. For example, the raw data may be organized into a variety of tables based on the attributes of the entity recorded activity.

At operation 404, the behavior profile may be constructed based on the variety of attribute tables using relational algebra such that the behavior profile is a separate table based on one entity and the entity's corresponding attributes (e.g., recorded activity). In this regard, the relational database objects and the behavior profile may be stored in the database 140. In one embodiment, the behavior profile may be stored in a cache for the database 140.

At operation 406, the data in the behavior profile is normalized. The data in the behavior profile may be stored in one large database table such that it is normalized into more than one smaller table. For example, a first smaller table may index the data by client number, a second smaller table may index the data by request number, and third larger table may index the data by encryption type. Due to the potential for large amounts of input data and the effect this would have on importing into persistent storage, normalization techniques are used to reduce storage requirements by avoiding the storage of duplicate items.

Figure 5:
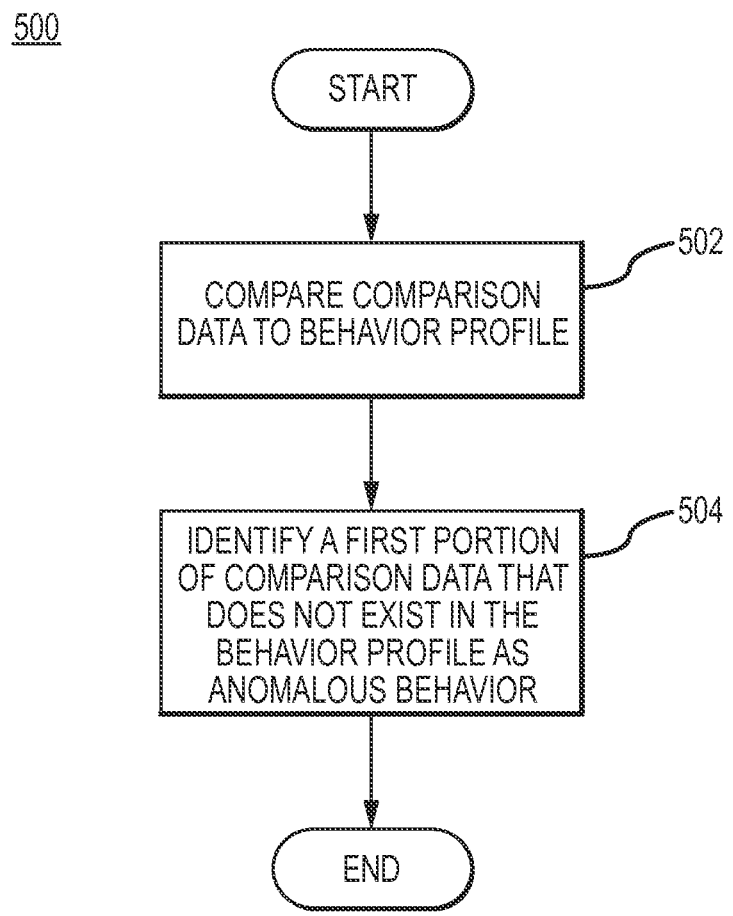
FIG. 5 is a flow diagram illustrating operations for determining whether comparison data deviates from the pattern of behavior defined in the behavior profile according to an embodiment of the present disclosure.

FIG. 5 illustrates a method 500 for determining whether comparison data deviates from the pattern of behavior defined in the behavior profile according to one or more embodiments of the present disclosure. In one embodiment, a method 500 begins at operation 502 in which comparison data is compared to the pattern of behavior defined in the behavior profile. Comparing the comparison data to the behavior profile may include overlaying the comparison data with the behavior profile to identify any differences. In another example, comparing the comparison data to the behavior profile may include identifying activities in the comparison data that are or are not in the behavior profile. In a further example, comparing the comparison data to the behavior profile may include analyzing attributes of the recorded activity such as access times, location data, client information, page requests made, returned status, returned bytes, PKI status, page referrer URL, common access card information, login name, encryption information, etc. After comparison data is compared to the behavior profile, flow proceeds to operation 504 where a first portion of the comparison data that does not exist in the behavior profile is identified as anomalous behavior. As such, any portion of the comparison data that does not exist in the behavior profile may be identified as anomalous behavior. Additionally, the lack of expected behavior in the comparison data (e.g., expected behavior that does exist in the behavior profile) may be identified as anomalous behavior. For example, expected behavior that exists in the behavior profile may include some action that a user always takes.

Figure 6:
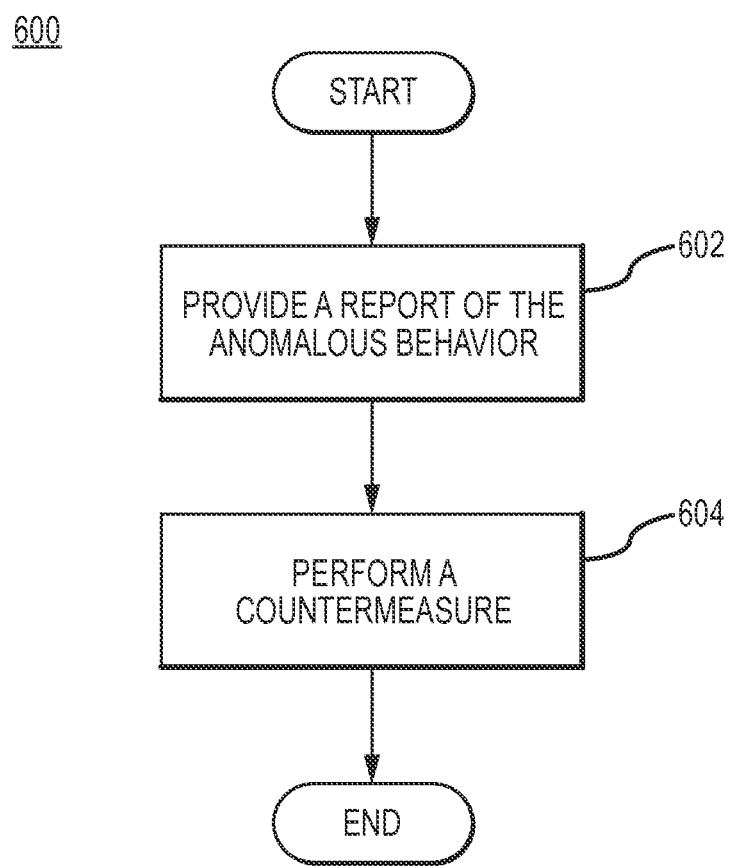
FIG. 6 is a flow diagram illustrating operations performed after identifying comparison data as anomalous behavior according to an embodiment of the present disclosure.

FIG. 6 illustrates a method 600 for performing operations after identifying comparison data as anomalous behavior according to one or more embodiments of the present disclosure. In one embodiment, a method 600 begins at operation 602 in which a report of the anomalous behavior is provided. The report may be received at web services 150 such that the report can be displayed by GUI 160. The report may be at least a suspect activity report and an interactive report. The suspect activity report may define criteria for suspect activity. For example, the suspect activity report may include a day of the week and report the criteria for suspect activity for that day of the week. The interactive report may define criteria for normal activity (e.g., the pattern of behavior defined in the behavior profile) and for suspect activity.

At operation 604, a countermeasure may be performed. The countermeasure may include at least one of revoking the entity's credentials, denying the entity access to a resource, shutting down access to a port, and denying access to the entity. In turn, a threat to a resource, for example, may be prevented and/or stopped.

Figure 7:
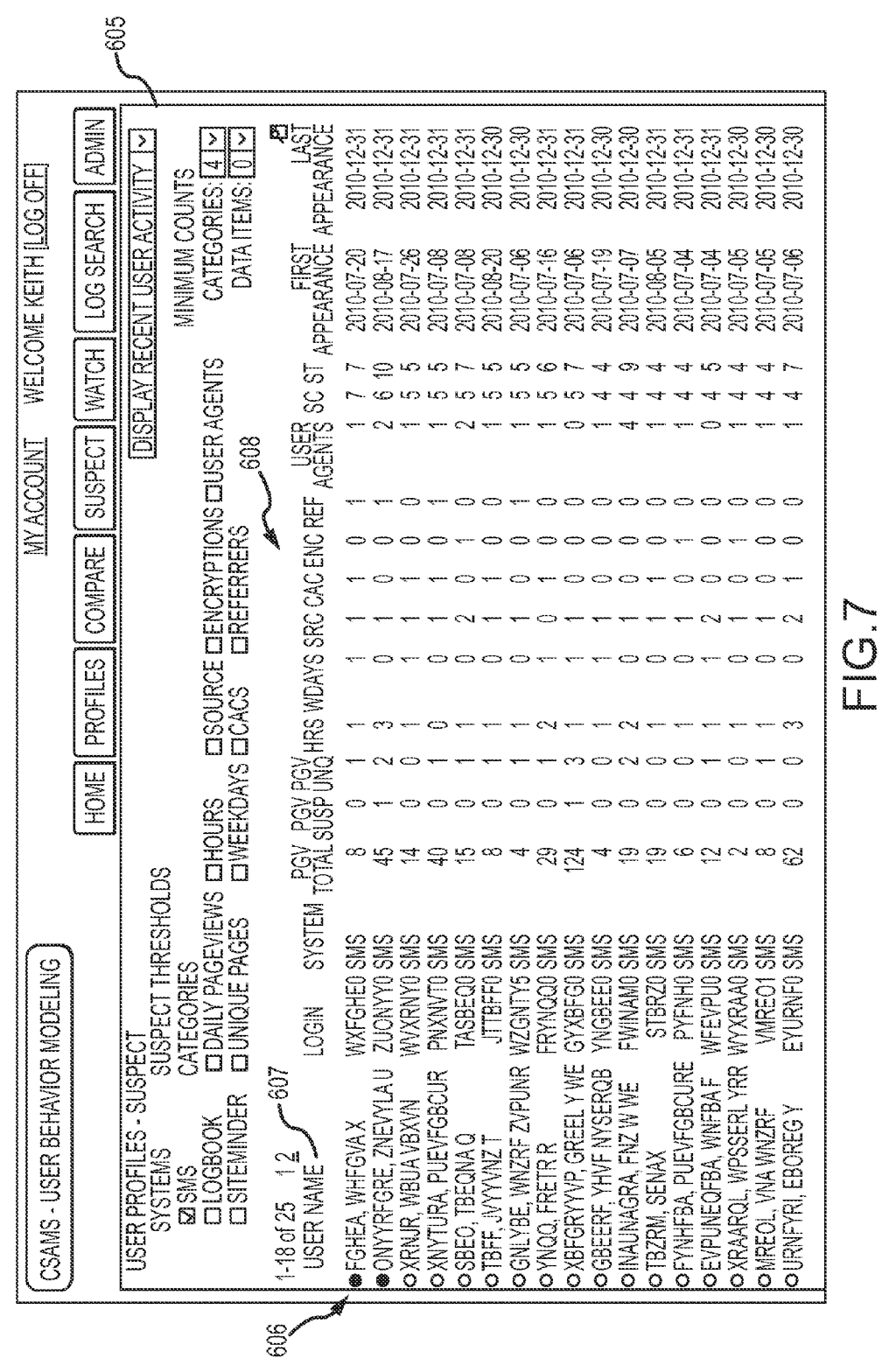

FIG. 7 illustrates an example of suspect user behavior profiles shown via a graphical user interface according to one or more embodiments of the present disclosure. As shown in FIG. 7, a suspect page 605 may include a list of behavior profiles 606 that include suspect behavior and that are indexed by user name 607. Behavior profiles may be marked as suspect if recent activity of a user (e.g., comparison data) deviates from the expected behavior in the behavior profile. Additional information 608 (e.g., attributes) for each behavior profile may be shown such as daily page views, unique page views, hours spent, the days the page was viewed, sources (e.g., clients) used, common access cards used, encryption types, referrers, user agents, first appearance, and last appearance.

Figure 8:
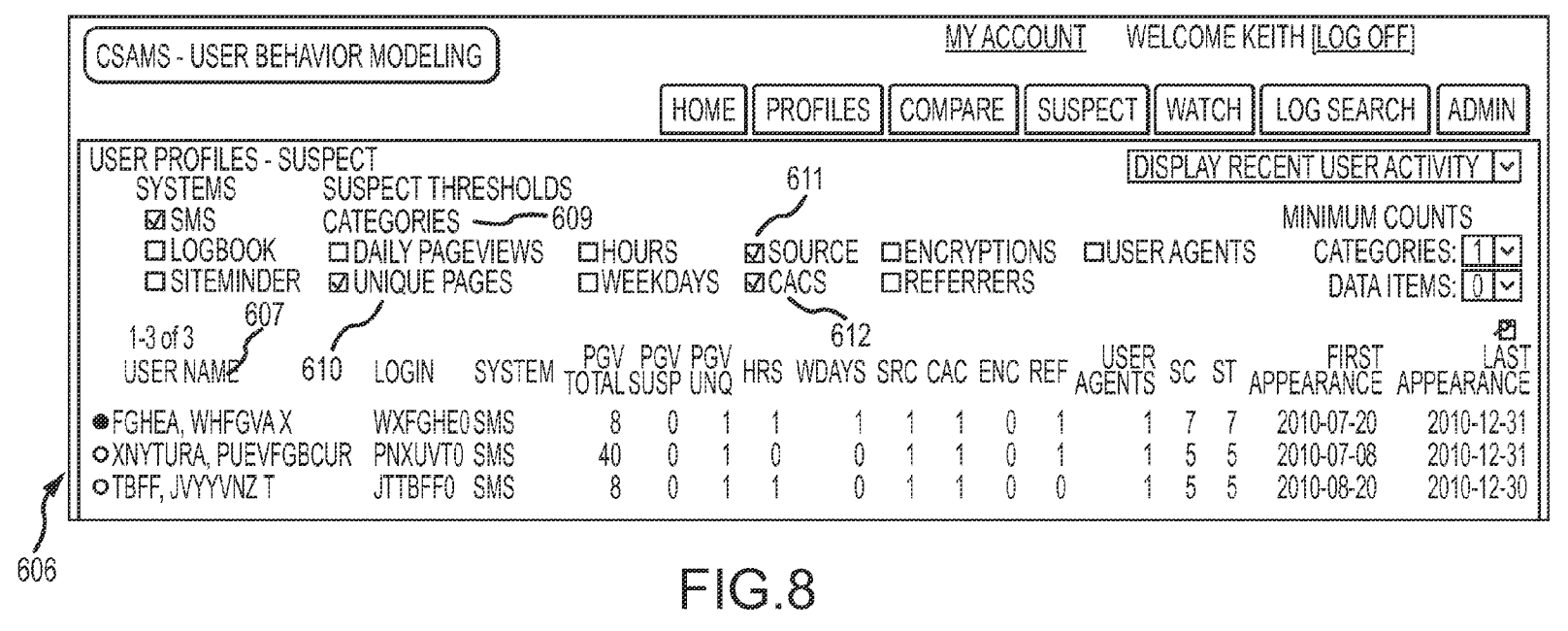

FIG. 8 illustrates an example of filtering suspect user profiles by categories via a graphical user interface according to one or more embodiments of the present disclosure. The suspect behavior profiles 606 may be filtered by one or more categories 609 (e.g., attributes). For example, as shown in FIG. 8, the suspect behavior profiles may be filtered by unique pages viewed 610, sources used 611, and common access cards used 612. In this example, only those behavior profiles that include a "hit" in each of the unique pages viewed 610, sources used 611, and common access cards used 612 categories 609 will continue to be shown on the graphical user interface. It is appreciated that the behavior profiles may be filtered by only one category 609, by all categories 609, or by any number of categories 609 desired.

While specific information is illustrated and described with respect to FIG. 8, one of skill in the art will appreciate that other types of information may be gathered and or displayed without departing from the scope of the disclosure.

Figure 9:
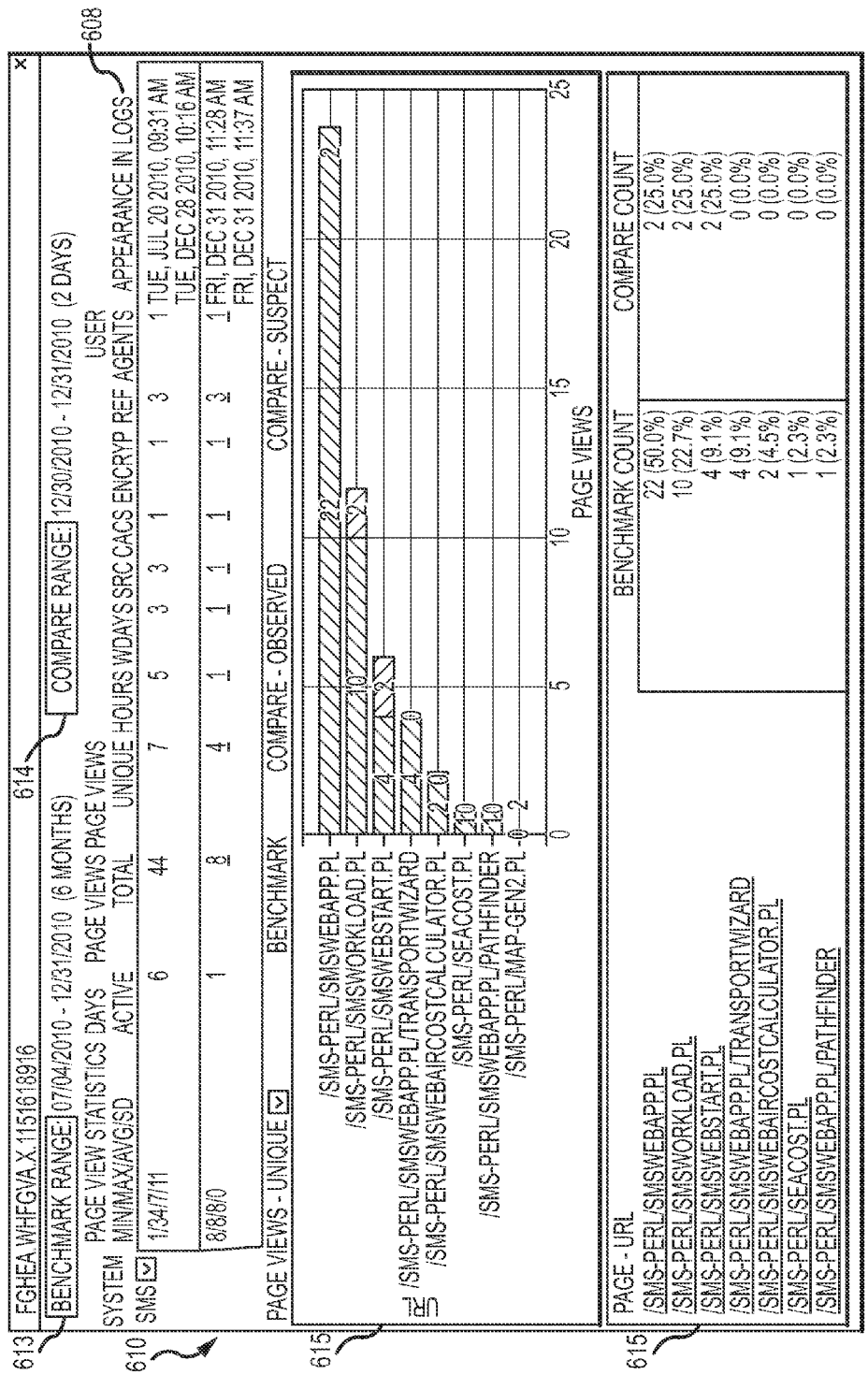
FIG. 9 is a graphical user interface example illustrating page views of a suspect user profile according to an embodiment of the present disclosure.

FIG. 9 illustrates an example of the unique page views category of a behavior profile via a graphical user interface according to one or more embodiments of the present disclosure. The unique page views category 610 shows the benchmark date range 613 and the comparison date range 614. In the exemplary embodiment, the benchmark date range 613 includes six months of data and the comparison date range 614 includes two days of data, however one of skill in the art will appreciate that other date ranges may be employed. The unique page views category 610 for the given behavior profile may include additional information 608 for the benchmark data and the comparison data such as daily page views, unique page views, hours spent, the days the page was viewed, sources (e.g., clients or devices) used, common access cards used, encryption types, referrers, user agents, first appearance, and last appearance. The unique page views category 610 further shows the URLs 615 of each unique page viewed for both the benchmark and comparison data. While specific information is illustrated and described with respect to FIG. 9, one of skill in the art will appreciate that other types of information may be gathered and or displayed without departing from the scope of the disclosure.

Figure 10:
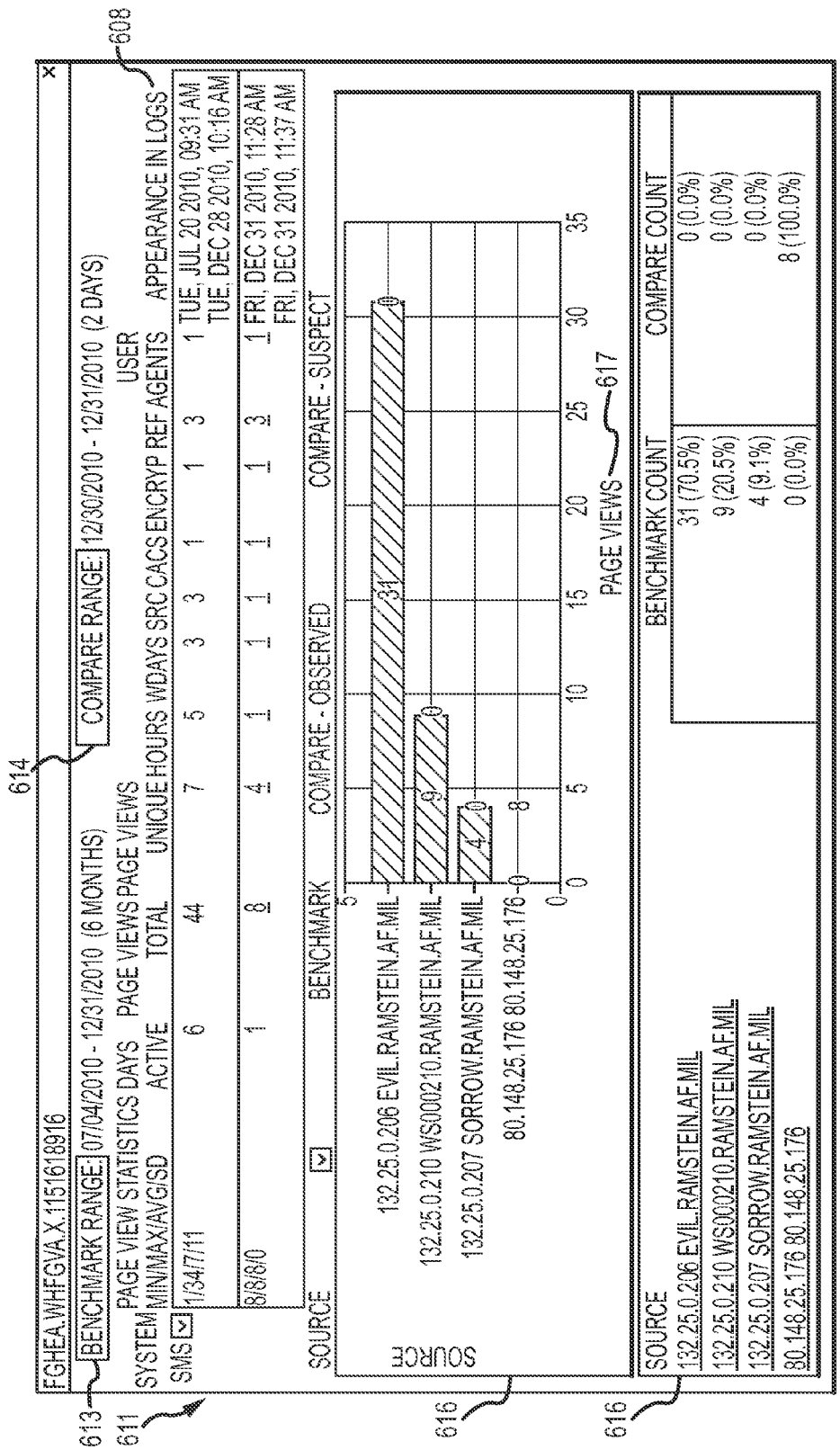
FIG. 10 is a graphical user interface example illustrating sources of a suspect user profile according to an embodiment of the present disclosure.

FIG. 10 illustrates an example of the sources category of the behavior profile via a graphical user interface according to one or more embodiments of the present disclosure. In the exemplary embodiment, the sources category 611 shows data for the same benchmark and comparison date ranges 613, 614 as that shown in FIG. 9. The sources category 611 also includes the same additional information 608 as that shown in FIG. 9, e.g., daily page views, unique page views, hours spent, the days the page was viewed, sources (e.g., clients) used, common access cards used, encryption types, referrers, user agents, first appearance, and last appearance. The sources category 611 further shows the different sources used 616 and the total number of page views 617 from each source for both the benchmark and comparison data. While specific information is illustrated and described with respect to FIG. 10, one of skill in the art will appreciate that other types of information may be gathered and or displayed without departing from the scope of the disclosure.

Figure 11:
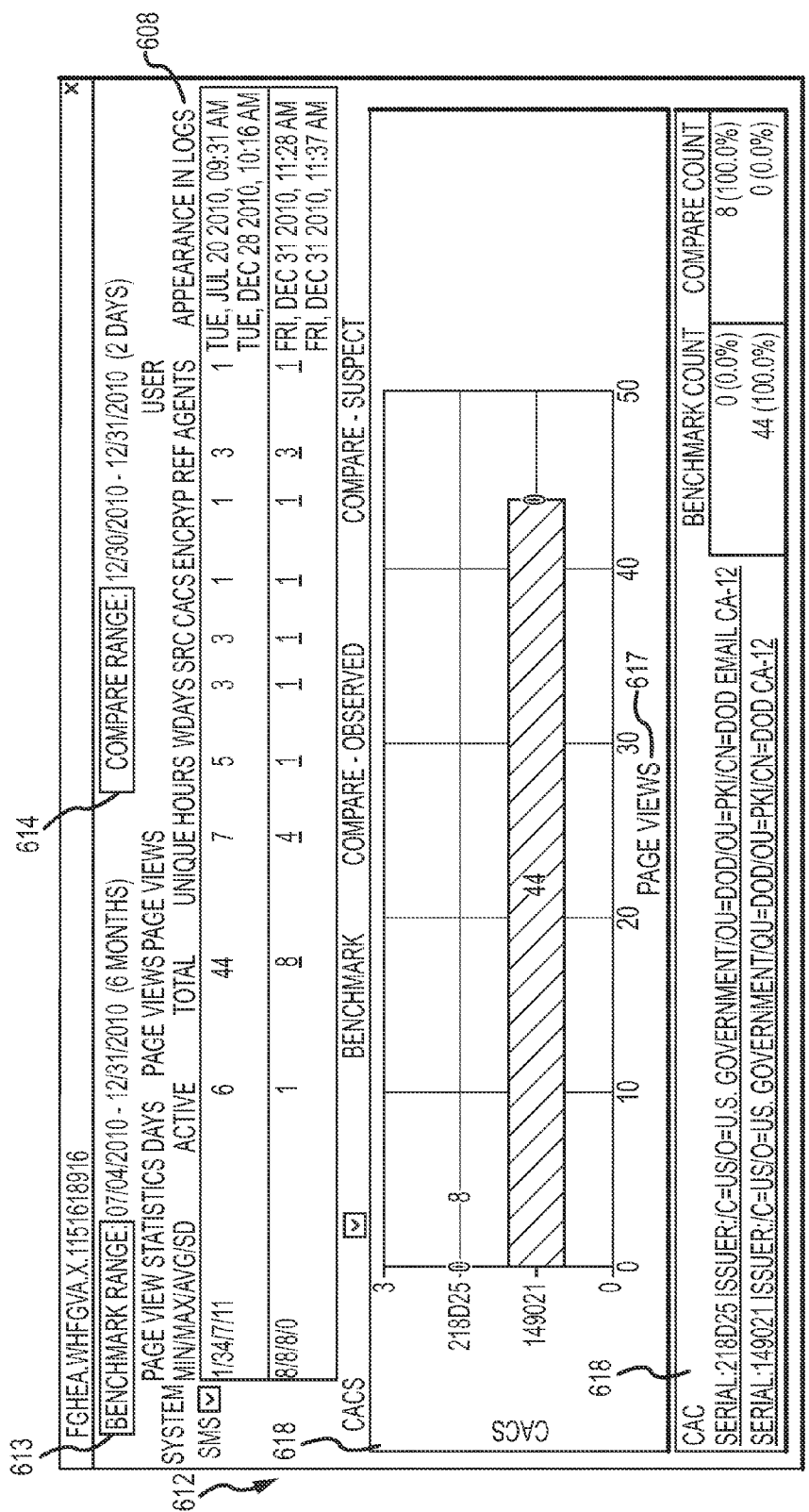
FIG. 11 is a graphical user interface example illustrating common access cards of a suspect user profile according to an embodiment of the present disclosure.

FIG. 11 illustrates an example of the common access cards category of the behavior profile via a graphical user interface according to one or more embodiments of the present disclosure. The common access cards category 612 shows data for the same benchmark and comparison date ranges 613, 614 as that shown in FIGS. 9 and 10, however other benchmark and comparison data ranges may be employed with the embodiments disclosed herein. The common access cards category 612 also includes the same additional information 608 as that shown in FIGS. 9 and 10, e.g., daily page views, unique page views, hours spent, the days the page was viewed, sources (e.g., clients) used, common access cards used, encryption types, referrers, user agents, first appearance, and last appearance. The common access cards category 612 further shows the different common access cards used 618 and the total number of pages viewed 617 from each common access card for both the benchmark and comparison data. While specific information is illustrated and described with respect to FIG. 11, one of skill in the art will appreciate that other types of information may be gathered and or displayed without departing from the scope of the disclosure.

Figure 12:
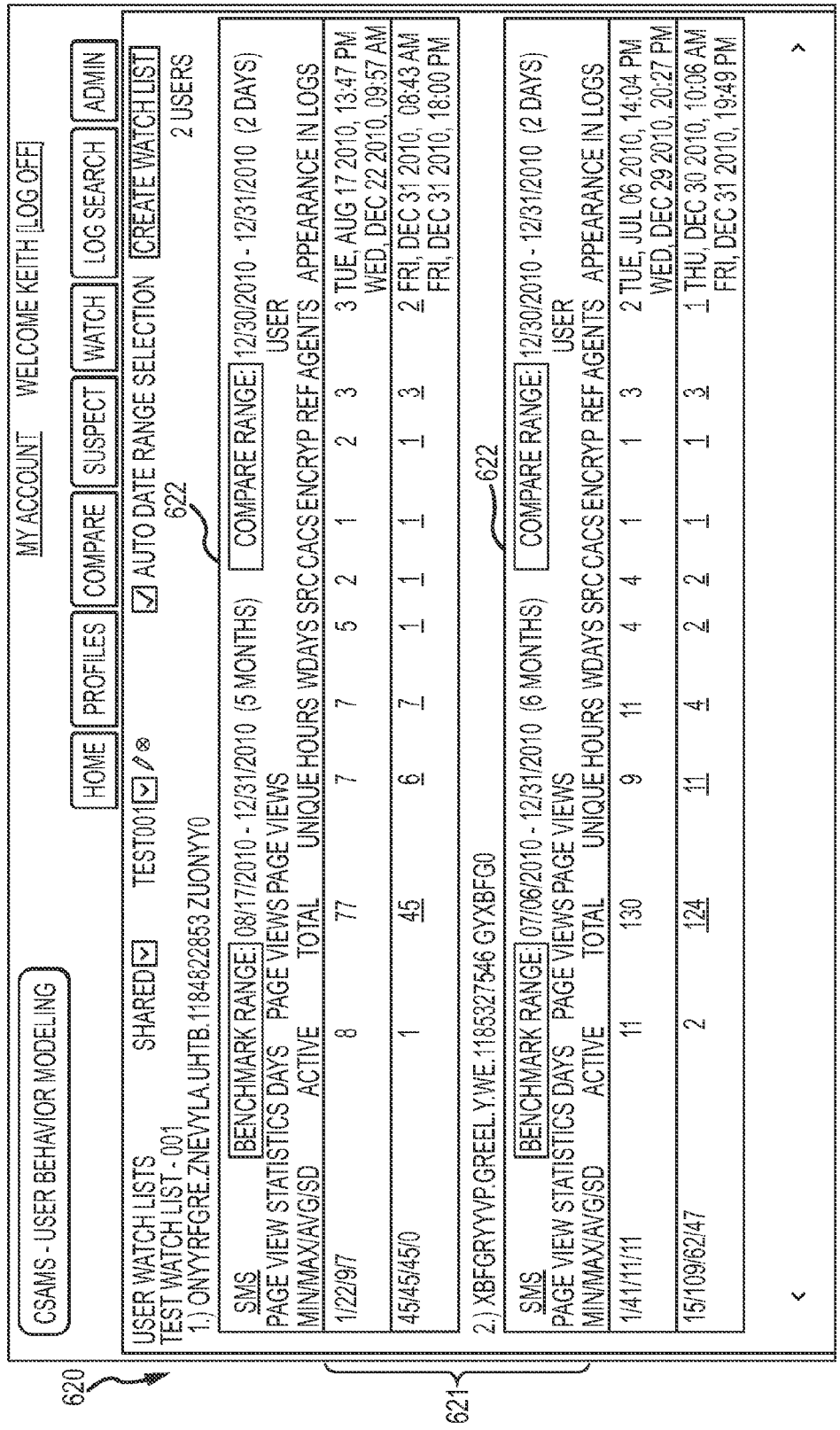
FIG. 12 is a graphical user interface example illustrating a watch list of user profiles according to an embodiment of the present disclosure.

FIG. 12 illustrates an example of a watch list of behavior profiles via a graphical user interface according to one or more embodiments of the present disclosure. The watch list 620 illustrated in FIG. 12 shows two behavior profiles 621 including benchmark and comparison data 622 (each having its own desired date range). The benchmark and comparison data 622 includes daily page views, unique page views, hours spent, the days the page was viewed, sources (e.g., clients) used, common access cards used, encryption types, referrers, user agents, first appearance, and last appearance. As such, the behavior profiles 621 in the watch list 620 may be observed to identify potential future suspect and/or anomalous behavior. While specific information is illustrated and described with respect to FIG. 12, one of skill in the art will appreciate that other types of information may be gathered and or displayed without departing from the scope of the disclosure.

Figure 13:
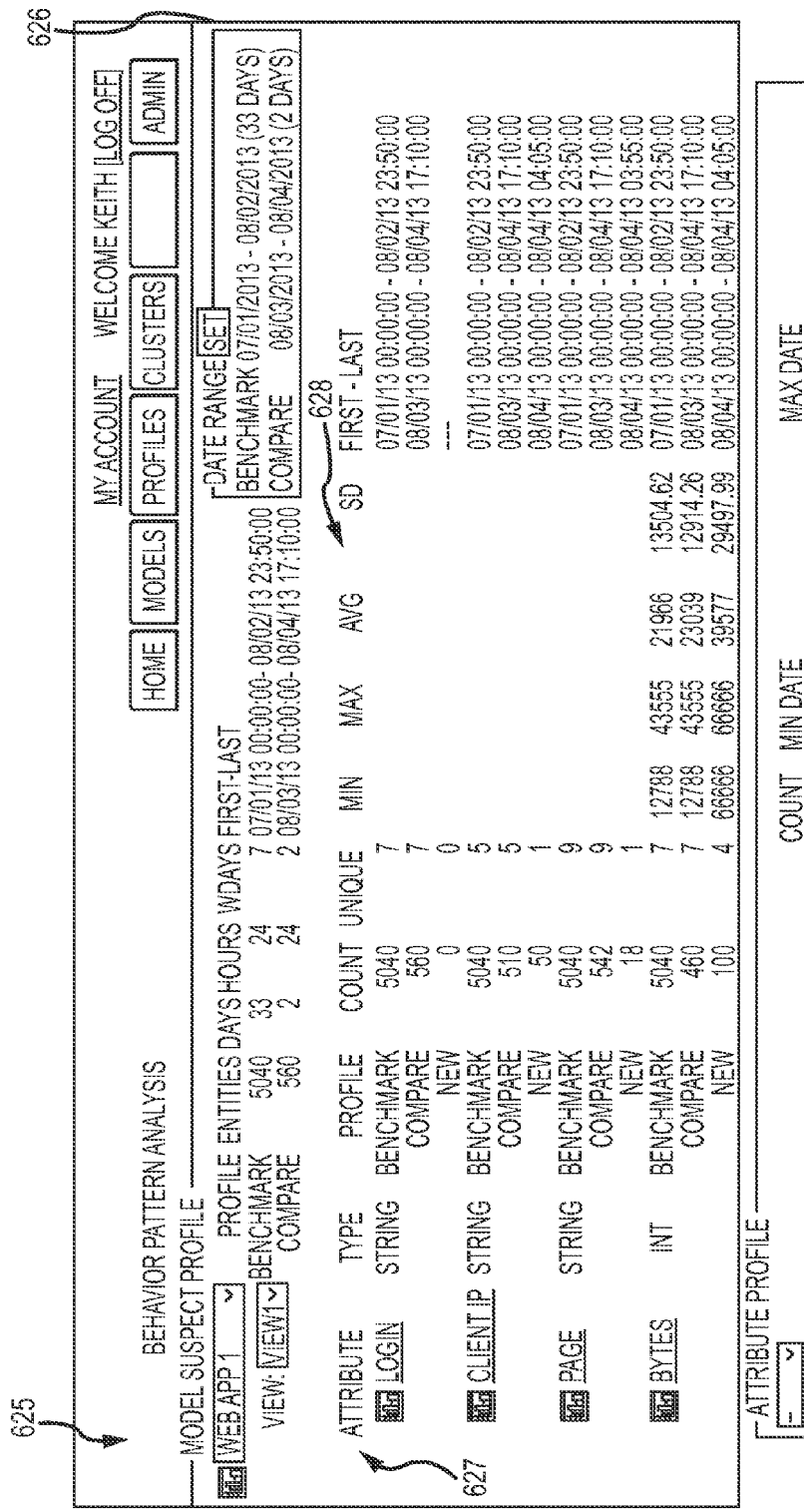
FIG. 13 is a graphical user interface example illustrating suspect user behavior profiles according to an embodiment of the present disclosure.

FIG. 13 illustrates an example of suspect user behavior profiles shown via a graphical user interface according to one or more embodiments of the present disclosure. As shown in FIG. 13, a behavior pattern analysis 625 may be done for suspect behavior profiles. A suspect page 626 may be indexed by attributes 627 (e.g., login, client IP, page, and bytes) of the recorded activity. Additional information 628 for the behavior pattern analysis may be shown such as benchmark records, comparison records, new records, unique records, minimum, maximum, average, and standard deviation values for recorded activity, the benchmark date range, and the comparison date range. While specific information is illustrated and described with respect to FIG. 13, one of skill in the art will appreciate that other types of information may be gathered and or displayed without departing from the scope of the disclosure.

Figure 14:
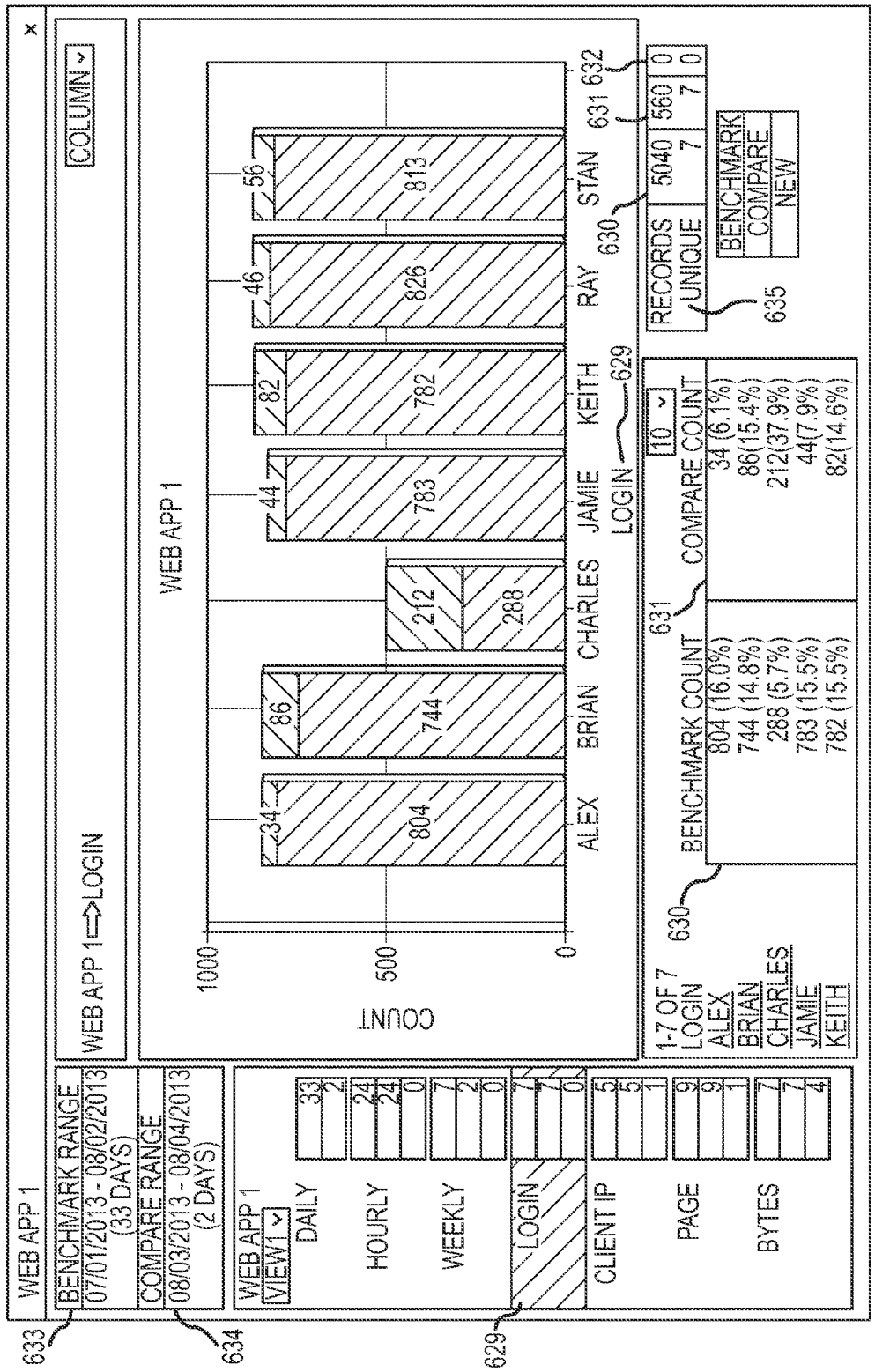
FIG. 14 is a graphical user interface example illustrating the login attribute of recorded activity according to an embodiment of the present disclosure.

FIG. 14 illustrates an example of the login attribute of the recorded activity via a graphical user interface according to one or more embodiments of the present disclosure. The login attribute 629 shows the benchmark records 630 for each user login, the comparison records 631 for each user login, and the new records 632 for each user login for the benchmark date range 633 and the comparison date range 634. The login attribute 629 also shows the number of unique records 635 for each of the benchmark, comparison, and new records. In the exemplary embodiment, the benchmark date range includes 33 days of data and the comparison date range includes two days of data, however one of skill in the art will appreciate that other date ranges may be employed. While specific information is illustrated and described with respect to FIG. 14, one of skill in the art will appreciate that other types of information may be gathered and or displayed without departing from the scope of the disclosure.

Figure 15:
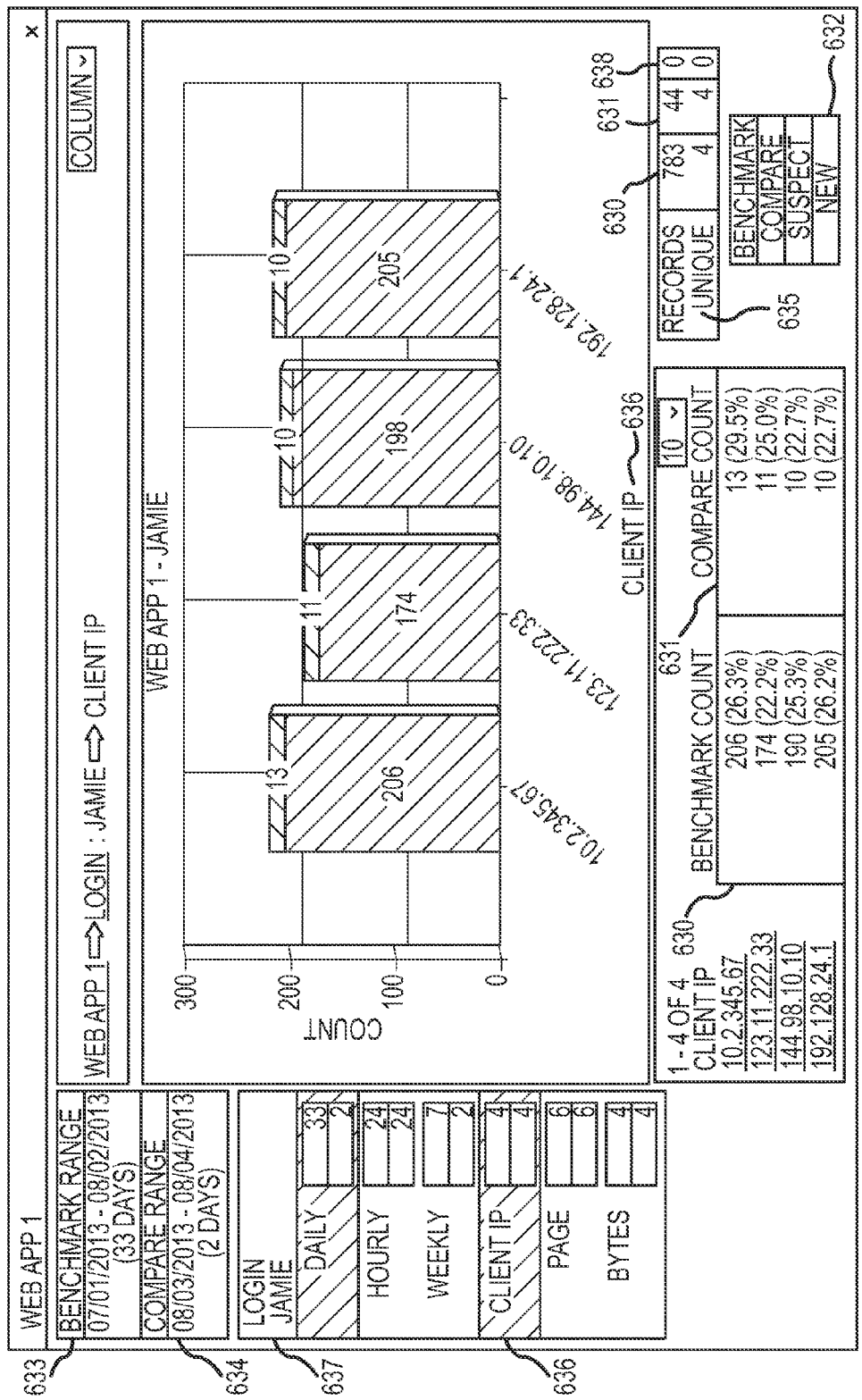
FIG. 15 is a graphical user interface example illustrating the client IP attribute of recorded activity according to an embodiment of the present disclosure.

FIG. 15 illustrates an example of the client IP attribute of the recorded activity via a graphical user interface according to one or more embodiments of the present disclosure. In the exemplary embodiment, the client IP attribute 636 is shown for the user login Jamie 637. The client IP attribute 636 shows data for the same benchmark and comparison date ranges 633/634 as that shown in FIG. 14, however other benchmark and comparison data ranges may be employed with the embodiments disclosed herein. The client IP attribute 636 also includes similar information as that shown in FIG. 14, e.g., the benchmark records 630 for each client IP, the comparison records 631 for each client IP, the new records 632 for each client IP, and the unique records 635 for the client IP attribute. FIG. 15 also shows the total number of suspect records 638 for client IP attribute. While specific information is illustrated and described with respect to FIG.

15, one of skill in the art will appreciate that other types of information may be gathered and or displayed without departing from the scope of the disclosure.

Figure 16:
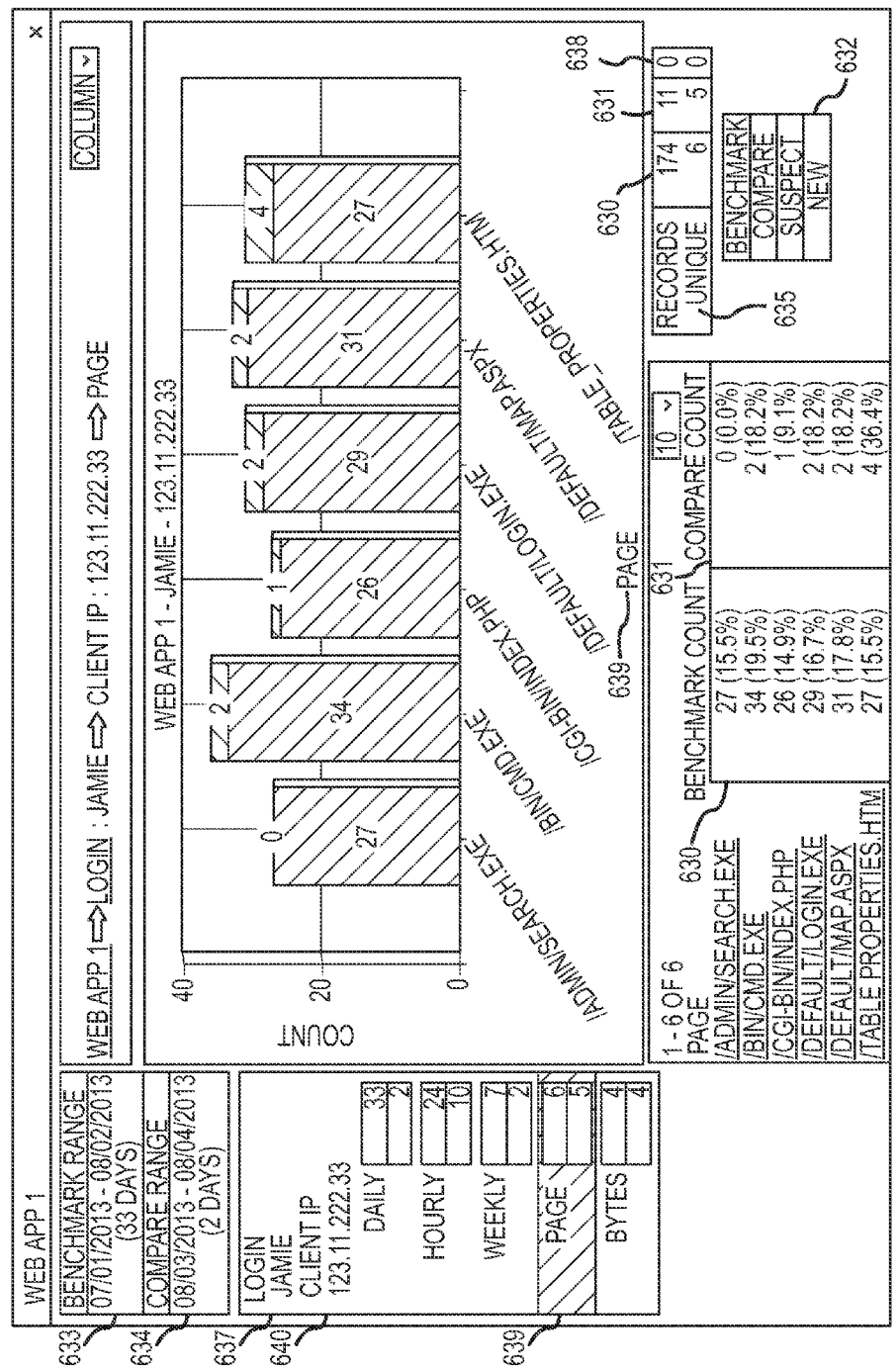
FIG. 16 is a graphical user interface example illustrating the page attribute of recorded activity according to an embodiment of the present disclosure.

FIG. 16 illustrates an example of the page attribute of the recorded activity via a graphical user interface according to one or more embodiments of the present disclosure. In the exemplary embodiment, the page attribute 639 is shown for the user login Jamie 637 and the client IP 123.11.222.33 640. The page attribute 639 shows data for the same benchmark and comparison date ranges 633/634 as that shown in FIGS. 14-15, however other benchmark and comparison data ranges may be employed with the embodiments disclosed herein. The page attribute 639 also includes similar information as that shown in FIGS. 14-15, e.g., the benchmark records 630 for each page, the comparison records 631 for each page, the new records 632 for the page attribute, the suspect records 638 for the page attribute, and the unique records 635. While specific information is illustrated and described with respect to FIG. 16, one of skill in the art will appreciate that other types of information may be gathered and or displayed without departing from the scope of the disclosure.

Figure 17:
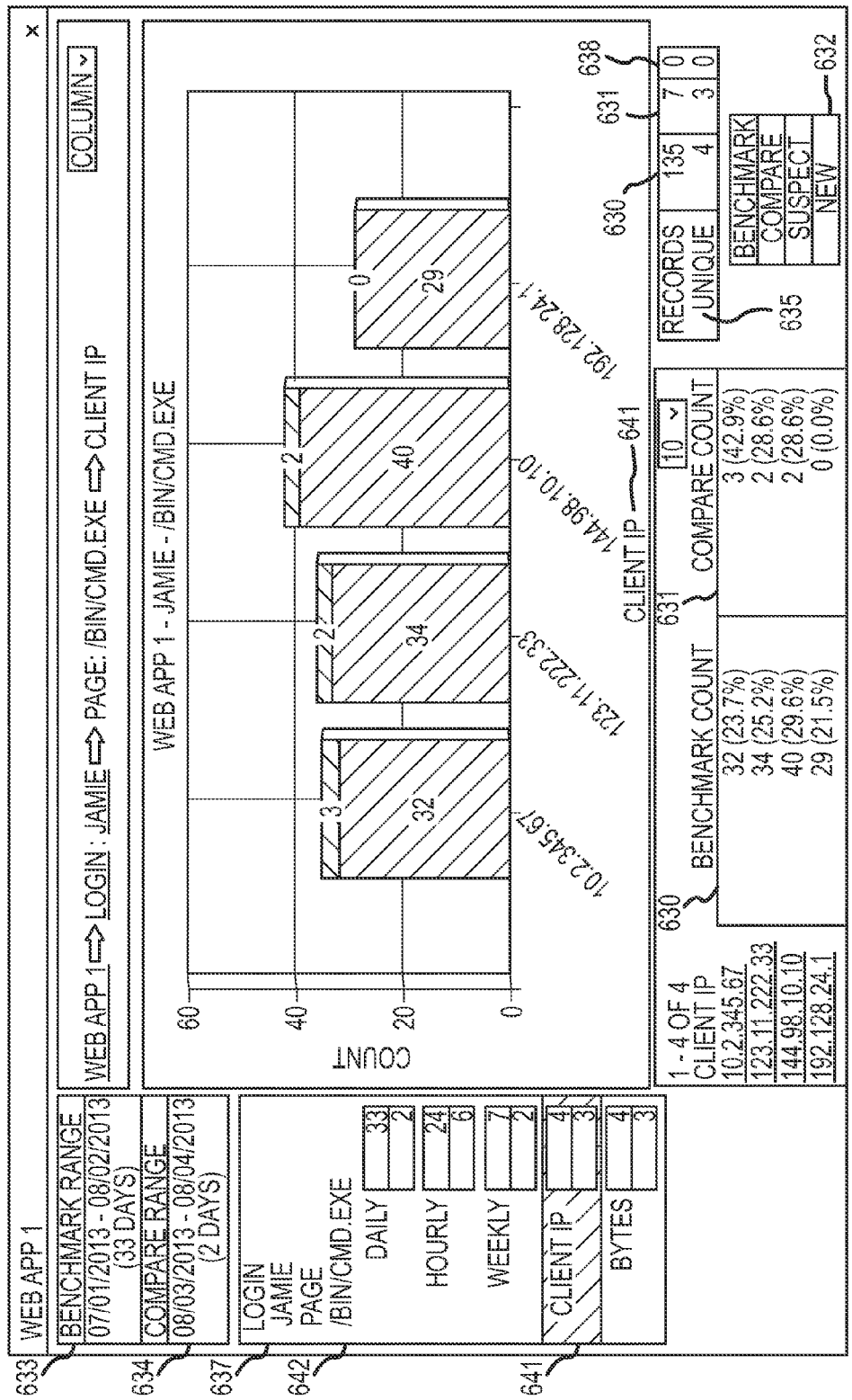
FIG. 17 is a graphical user interface example illustrating the client attribute of recorded activity according to an embodiment of the present disclosure.

FIG. 17 illustrates an example of the client IP attribute of the recorded activity via a graphical user interface according to one or more embodiments of the present disclosure. In the exemplary embodiment, the client IP attribute 641 is shown for the user login Jamie 637 and the page /bin/cmd.exe 642. The client IP attribute 641 shows data for the same benchmark and comparison date ranges 633/634 as that shown in FIGS. 14-16, however other benchmark and comparison data ranges may be employed with the embodiments disclosed herein. The client IP attribute 641 also includes similar information as that shown in FIGS. 14-16, e.g., the benchmark records 630 for each client IP, the comparison records 631 for each client IP, the new records 632 for the client IP attribute, the suspect records 638 for the client IP attribute, and the unique records 635. As shown, FIGS. 15 and 17 both show an example of the client IP attribute. However, the client IP attribute 641 in FIG. 17 is based on the login attribute Jamie 637 and the page attribute /bin/cmd.exe 642. For example, the client IP attribute records 641 are shown for the case when both the user login is Jamie and the page is /bin/cmd.exe. In FIG. 15, the client IP attribute records 636 are shown for the case when the user login is Jamie. In this regard, FIG. 17 shows a pivoted behavior pattern analysis. While specific information is illustrated and described with respect to FIG. 17, one of skill in the art will appreciate that other types of information may be gathered and or displayed without departing from the scope of the disclosure.

Figure 18:
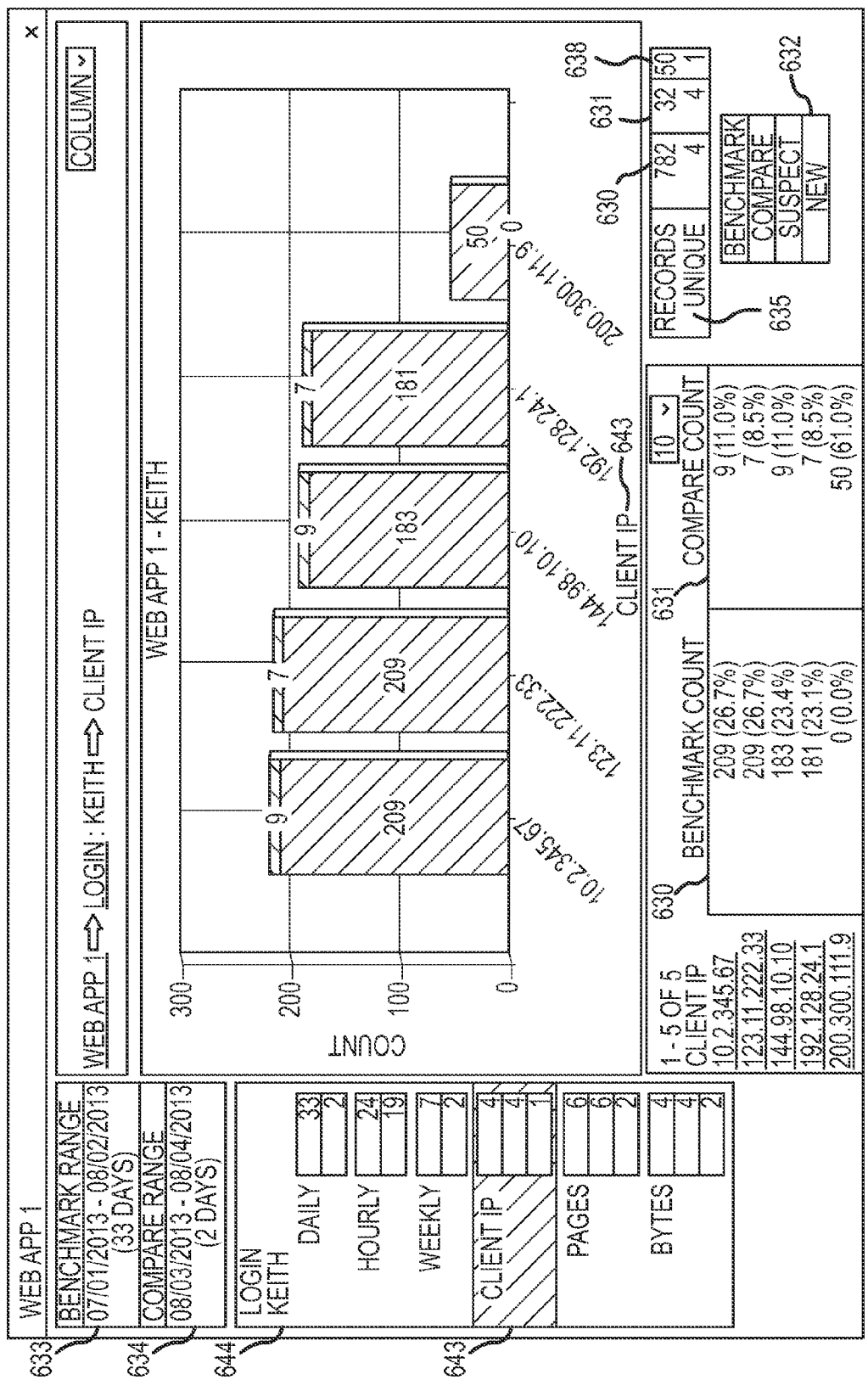
FIG. 18 is a graphical user interface example illustrating the client IP attribute of recorded activity according to an embodiment of the present disclosure.

FIG. 18 illustrates an example of the client IP attribute of the recorded activity via a graphical user interface according to one or more embodiments of the present disclosure. In the exemplary embodiment, the client IP attribute 643 is shown for the user login Keith 644. The client IP attribute 643 shows data for the same benchmark and comparison date ranges 633/634 as that shown in FIGS. 14-17, however other benchmark and comparison data ranges may be employed with the embodiments disclosed herein. The client IP attribute 643 also includes similar information as that shown in FIGS. 14-17, e.g., the benchmark records 630 for each client IP, the comparison records 631 for each client IP, the new records 632 for the page attribute, the suspect records 638 for the page attribute, and the unique records 635. While specific information is illustrated and described with respect to FIG. 18, one of skill in the art will appreciate that other types of information may be gathered and or displayed without departing from the scope of the disclosure.

Figure 19:
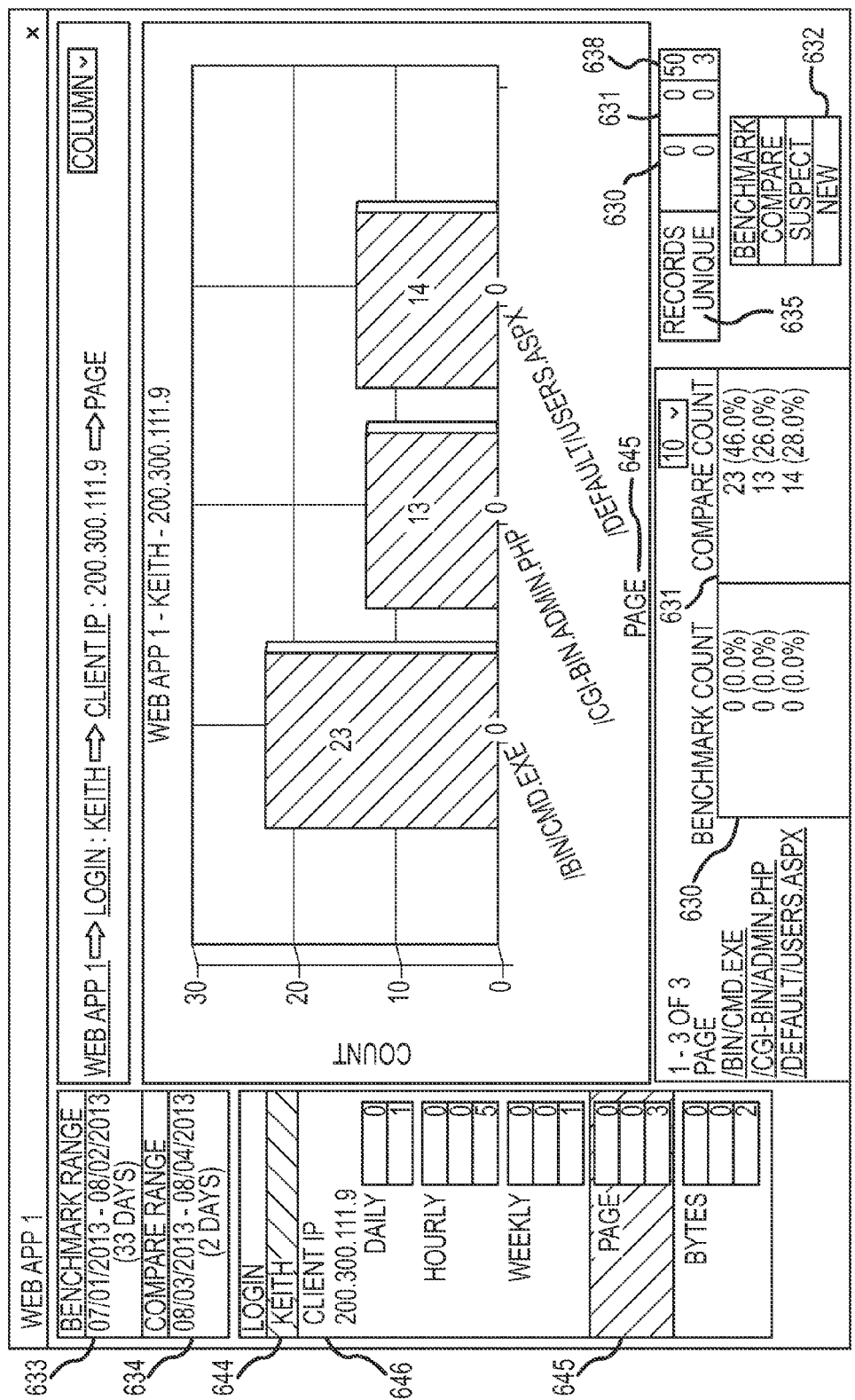
FIG. 19 is a graphical user interface example illustrating the page attribute of recorded activity according to an embodiment of the present disclosure.

FIG. 19 illustrates an example of the page attribute of the recorded activity via a graphical user interface according to one or more embodiments of the present disclosure. In the exemplary embodiment, the page attribute 645 is shown for the user login Keith 644 and the client IP 200.300.111.9 646. The page attribute 645 shows data for the same benchmark and comparison date ranges 633/634 as that shown in FIGS. 14-18, however other benchmark and comparison data ranges may be employed with the embodiments disclosed herein. The page attribute 645 also includes similar information as that shown in FIGS. 14-18, e.g., the benchmark records 630 for each page, the comparison records 631 for each page, the new records 632 for the page attribute, the suspect records 638 for the page attribute, and the unique records 635. While specific information is illustrated and described with respect to FIG. 19, one of skill in the art will appreciate that other types of information may be gathered and or displayed without departing from the scope of the disclosure.

FIG. 20 illustrates an example of a suspect grid shown via a graphical user interface according to one or more embodiments of the present disclosure. As shown in FIG. 20, a behavior pattern analysis 625 may be done for suspect behavior profiles. A suspect page 626 may be indexed by attributes 627 (e.g., login, client IP, page, and bytes) of the recorded activity. Additional information 628 for the behavior pattern analysis 625 may be shown such as benchmark records, comparison records, new records, unique records, minimum, maximum, average, and standard deviation values for recorded activity, the benchmark date range, and the comparison date range. The suspect page 626 may also include an attribute profile 650. In the exemplary embodiment, the attribute profile 650 may be indexed by the client IP attribute 651. The attribute profile 650 may include additional information 652 such as the records, a minimum date, a maximum date, the login attribute, the page attribute, and the byte attribute. While specific information is illustrated and described with respect to FIG. 20, one of skill in the art will appreciate that other types of information may be gathered and or displayed without departing from the scope of the disclosure.

Figure 21:
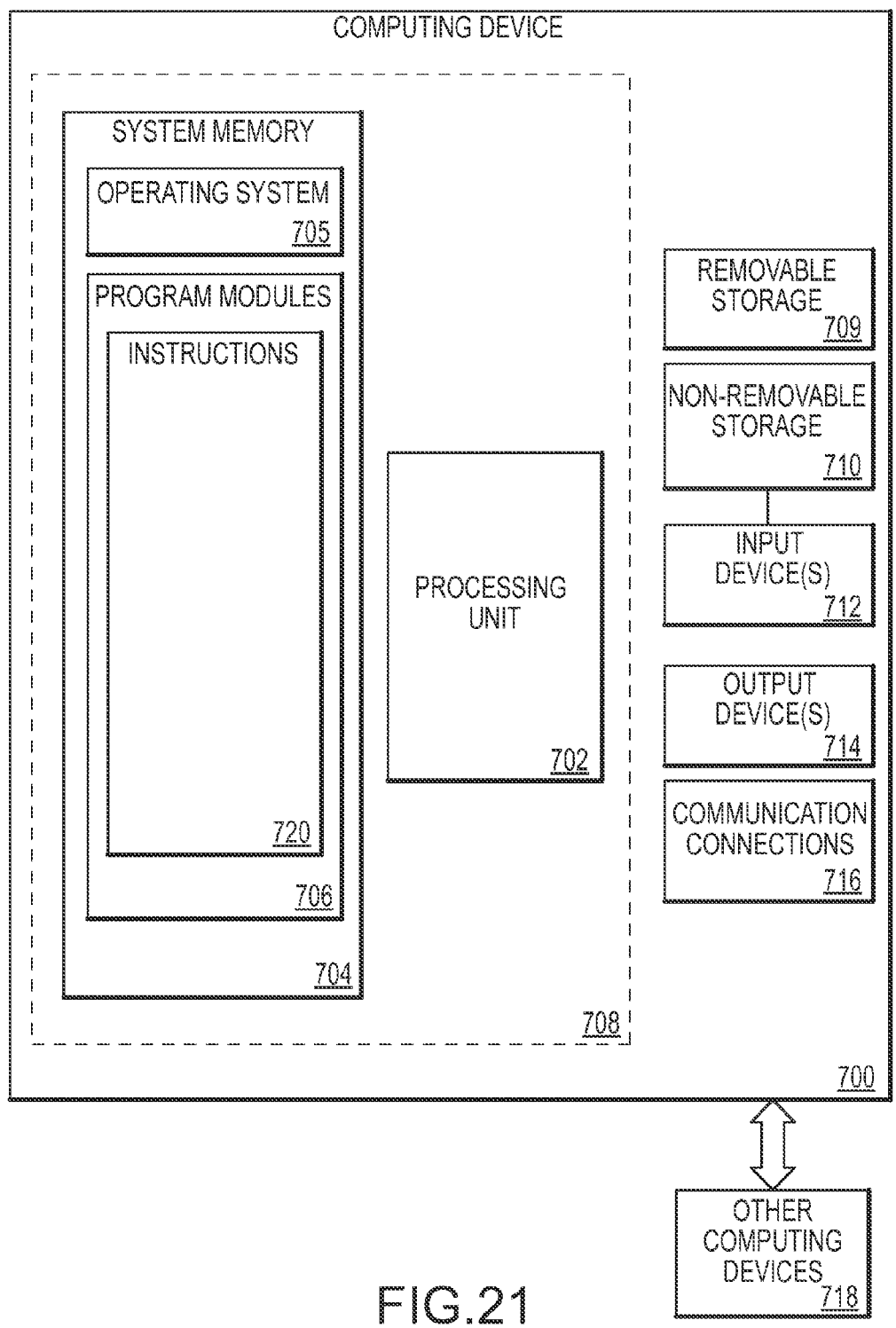
FIG. 21 is a block diagram illustrating physical components (e.g., hardware) of a computing device according to an embodiment of the present disclosure.
Figure 22:
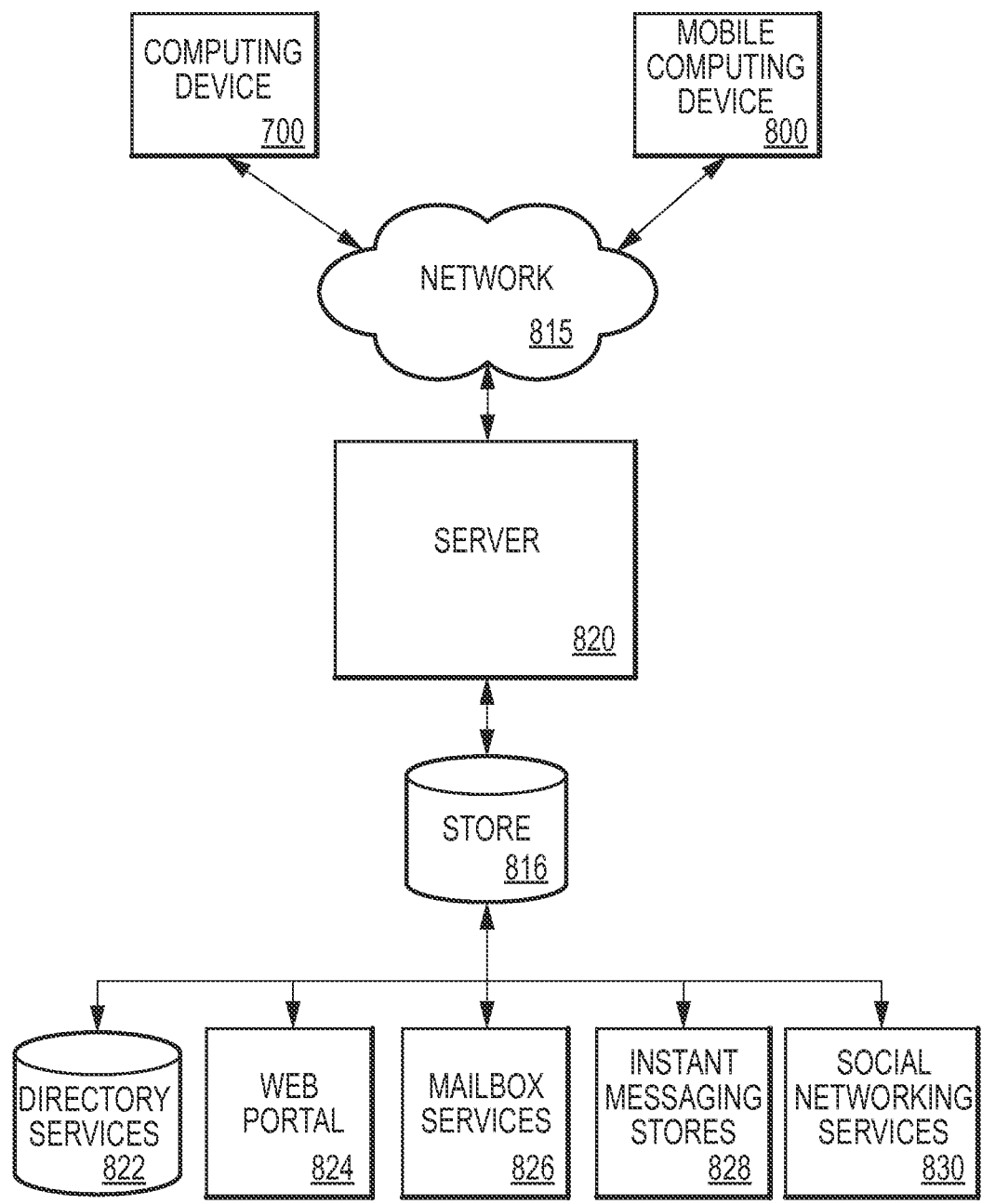
FIG. 22 is a block diagram illustrating a system for transferring data between different computing devices according to an embodiment of the present disclosure.

FIGS. 21-22 and the associated descriptions provide a discussion of a variety of operating environments in which embodiments of the present disclosure may be practiced. However, the devices and systems illustrated and discussed with respect to FIGS. 21-22 are for purposes of example and illustration and are not limiting of a vast number of computing device configurations that may be utilized for practicing embodiments described herein.

FIG. 21 is a block diagram illustrating physical components (e.g., hardware) of a computing device 700 with which embodiments of the present disclosure may be practiced. The computing device components described below may be suitable for the computing environment 100 described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software instructions for identifying anomalous behavior 720 or other code that is to be analyzed for Cyber-Semantic account management purposes. The software instructions for identifying anomalous behavior 720 may be suitable for performing embodiments of the present disclosure including those described above in conjunction with FIGS. 1-6. The operating system 705, for example, may be suitable for controlling the operation of the computing device 700. Furthermore, embodiments of the present disclosure may be practiced in conjunction with other operating systems, or any other application program and is not limited to any particular application or system. This basic configuration is illustrated in FIG. 21 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 21 by a removable storage device 709 and a non-removable storage device 710.

As stated above, a number of program modules and data files may be stored in the system memory 704. While executing on the processing unit 702, the program modules 706 may perform processes including, but not limited to, one or more of the stages of the methods described above in conjunction with FIGS. 3-6. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 21 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 700 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry, universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 22 illustrates one embodiment of the architecture of a system for transferring data between different computing devices including computing device 700 and mobile computing device 800. Data may be transferred between a client computing device and another computing device, such as, for example, a server computing device. Additionally, the data may be stored in different communication channels or other storage types. For example, various features, documents, resources, statistics and the like, may be stored using a directory service 822, a web portal 824, a mailbox service 826, an instant messaging store 828, or a social networking site 830. A server 820 may provide data to and from client computing device 700. As one example, the server 820 may be a web server. The server 820 may provide data to a computing device 700 or the mobile computing device 800 over the web through a network 815. By way of example, the operating environment described above with respect to FIG. 1 may be embodied in a personal computer, a tablet computing device and/or a mobile computing device 800 (e.g., a smart phone). Any of these embodiments may obtain content from the store 816.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Additionally, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

The description and illustration of one or more embodiments provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

We claim:

1. A method for identifying anomalous behavior of an entity, the method comprising:
   receiving raw data comprising recorded activity for the entity, wherein the recorded activity is associated with a first objective related to a first event from a first data source and a second objective related to a second event from a second data source, wherein the first objective is unrelated to the second objective and the first event is unrelated to the second event;
   dynamically generating, by a computing device, an on demand behavior profile for the entity based on the raw data, wherein the behavior profile defines a pattern of behavior for the entity related to one or more transactions, and wherein generating the behavior profile comprises transforming the raw data into one or more relational database objects;
   receiving comparison data;
   determining whether the comparison data deviates from the pattern of behavior defined in the behavior profile, for a specific transaction; and
   when the comparison data deviates from the pattern of behavior, identifying the comparison data as anomalous behavior.

2. The method of claim 1, further comprising providing a report of the anomalous behavior.

3. The method of claim 1, further comprising upon identifying anomalous behavior, performing a countermeasure.

4. The method of claim 3, wherein the countermeasure comprises at least one of:
   revoking the entity's credentials;
   denying the entity access to a resource;
   shutting down access to a port; and
   denying access to the entity.

5. The method of claim 1, wherein the raw data is weblog data, and wherein the weblog data comprises at least one of:
   IP address information;
   browsing history;
   download data; and
   time information.

6. The method of claim 1, wherein the raw data comprises at least one of:
   web service endpoints;
   mission role data;
   system transactions; and
   resource access.

7. The method of claim 1, wherein generating the behavior profile further comprises:
   constructing the behavior profile using relational algebra.

8. The method of claim 7, wherein generating the behavior profile further comprises normalizing data in the behavior profile.

9. The method of claim 1, wherein the behavior profile is constructed for a specific date range.

10. The method of claim 1, wherein determining whether the comparison data deviates from the pattern of behavior further comprises:
    comparing the comparison data to the behavior profile; and
    identifying a first portion of the comparison data that does not exist in the behavior profile as anomalous behavior.

11. The method of claim 1, wherein determining whether the comparison data deviates from the pattern of behavior is based upon statistical analysis, wherein portions of the comparison data that lie outside a standard deviation of the behavior profile are identified as anomalous behavior.

12. A computer storage device encoding computer executable instructions that, when executed by at least one processor, perform a method for identifying anomalous behavior of an entity, the method comprising:
    receiving raw data comprising recorded activity for the entity, wherein the recorded activity is associated with a first objective related to a first event from a first data source and a second objective related to a second event from a second data source, wherein the first objective is unrelated to the second objective and the first event is unrelated to the second event ;
    dynamically generating, by a computing device, an on demand behavior profile for the entity based on the raw data, wherein the behavior profile defines a pattern of behavior for the entity related to one or more transactions, and wherein generating the behavior profile comprises transforming the raw data into one or more relational database objects;
    receiving comparison data;
    comparing the comparison data to the behavior profile for a specific transaction; and
    identifying a first portion of the comparison data that does not exist in the behavior profile as anomalous behavior.

13. The computer storage device of claim 12, wherein comparing the comparison data to the behavior data further comprises performing a statistical analysis on the behavior profile, wherein portions of the comparison data that lie outside a standard deviation of the behavior profile are identified as anomalous behavior.

14. The computer storage device of claim 12, wherein generating the behavior profile further comprises:
    constructing the behavior profile using relational algebra.

15. The computer storage device of claim 12, wherein the method further comprises providing a report of the anomalous behavior.

16. The computer storage device of claim 12, wherein the method further comprises, upon identifying anomalous behavior, performing a countermeasure, wherein the countermeasure comprises at least one of:
    revoking the entity's credentials;
    denying the entity access to a resource;
    shutting down access to a port; and
    denying access to the entity.

17. The computer storage device of claim 12, wherein the raw data is weblog data, and wherein the weblog data comprises at least one of:
    IP address information;

browsing history;
download data; and
time information.

18. A system comprising:
a server comprising:
  at least one processor; and
  memory encoding computer executable instructions that, when executed by at least one processor, perform a method for identifying anomalous behavior of an entity, the method comprising:
    receiving raw data comprising past recorded activity for the entity, wherein the past recorded activity is associated with a first objective related to a first event from a first data source and a second objective related to a second event from a second data source, wherein the first objective is unrelated to the second objective and the first event is unrelated to the second event;
    dynamically generating an on demand behavior profile for the entity based on the raw data, the behavior profile defining a pattern of behavior for the entity related to one or more transactions, wherein generating the behavior profile comprises transforming the raw data into one or more relational database objects;
    receiving comparison data;
      comparing the comparison data to the behavior profile for a specific transaction;
      identifying a first portion of the comparison data that does not exist in the behavior profile as anomalous behavior; and
    generating a report of the anomalous behavior.

19. The system of claim 18, wherein the method further comprises generating a cache table to store the behavior profile.

20. The system of claim 18, further comprising:
a client in communication with the sever, wherein the client receives and displays the report.

* * * * *